United States Patent
Melanson et al.

(10) Patent No.: US 9,609,701 B2
(45) Date of Patent: *Mar. 28, 2017

(54) SWITCH-MODE DRIVE SENSING OF REVERSE RECOVERY IN BIPOLAR JUNCTION TRANSISTOR (BJT)-BASED POWER CONVERTERS

(71) Applicant: Cirrus Logic, Inc., Austin, TX (US)

(72) Inventors: John L. Melanson, Austin, TX (US); Ramin Zanbaghi, Austin, TX (US); Thirumalai Rengachari, Chennai (IN); Prashanth Drakshapalli, Austin, TX (US); Rahul Singh, Austin, TX (US); Arnab Kumar Dutta, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,716

(22) Filed: Feb. 27, 2015

(65) Prior Publication Data

US 2016/0255685 A1 Sep. 1, 2016

(51) Int. Cl.
*H05B 37/02* (2006.01)
*H05B 33/08* (2006.01)
*H02M 3/335* (2006.01)

(52) U.S. Cl.
CPC ........ *H05B 33/0815* (2013.01); *H02M 3/335* (2013.01); *H05B 33/0845* (2013.01); *H05B 37/02* (2013.01)

(58) Field of Classification Search
CPC  H05B 37/02; H05B 33/0815; H05B 33/0845; H02M 3/335
USPC .... 315/209 R, 224–225, 291, 294, 297, 307; 363/21
See application file for complete search history.

(56) References Cited

U.S. PATENT DOCUMENTS

| | | |
|---|---|---|
| 3,660,751 A | 5/1972 | Bullinga |
| 3,790,878 A | 2/1974 | Brokaw |
| 4,322,785 A | 3/1982 | Walker |
| 4,339,671 A | 7/1982 | Park et al. |
| 4,342,956 A | 8/1982 | Archer |
| 4,399,500 A | 8/1983 | Clarke et al. |

(Continued)

FOREIGN PATENT DOCUMENTS

| | | |
|---|---|---|
| EP | 0536535 A1 | 4/1993 |
| EP | 0636889 A1 | 2/1995 |

(Continued)

OTHER PUBLICATIONS

International Search Report and Written Opinion mailed Sep. 18, 2014, during examination of PCT/US2014/038490.
Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.

(Continued)

*Primary Examiner* — Tung X Le
(74) *Attorney, Agent, or Firm* — Norton Rose Fulbright US LLP

(57) ABSTRACT

A bipolar junction transistor (BJT) may be used in a power stage DC-to-DC converter, such as a converter in LED-based light bulbs. The power stage may be operated by a controller to maintain a desired current output to the LED load. The controller may operate the power stage by monitoring a start and end of a reverse recovery time of the BJT. Information regarding the start and end of the reverse recovery time may be used in the control of the power stage to improve efficiency of the power stage.

24 Claims, 12 Drawing Sheets

(56) References Cited

U.S. PATENT DOCUMENTS

| | | |
|---|---|---|
| 4,410,810 A | 10/1983 | Christen |
| 4,493,017 A | 1/1985 | Kammiller et al. |
| 4,585,986 A | 4/1986 | Dyer |
| 4,629,971 A | 12/1986 | Kirk |
| 4,675,547 A | 6/1987 | Eichenwald |
| 4,677,366 A | 6/1987 | Wilkinson et al. |
| 4,683,529 A | 7/1987 | Bucher, II |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,970,635 A | 11/1990 | Shekhawat et al. |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,665 A | 6/1995 | Sueri et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,486,781 A | 1/1996 | Im |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,657,417 B1 | 12/2003 | Hwang |
| 6,661,182 B2 | 12/2003 | Sridharan |
| 6,696,803 B2 | 2/2004 | Tao et al. |
| 6,724,174 B1 | 4/2004 | Esteves et al. |
| 6,758,199 B2 | 7/2004 | Masters et al. |
| 6,768,655 B1 | 7/2004 | Yang et al. |
| 6,781,351 B2 | 8/2004 | Mednik et al. |
| 6,839,247 B1 | 1/2005 | Yang et al. |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,042,161 B1 | 5/2006 | Konopka |
| 7,072,191 B2 | 7/2006 | Nakao et al. |
| 7,099,163 B1 | 8/2006 | Ying |
| 7,161,816 B2 | 1/2007 | Shteynberg et al. |
| 7,221,130 B2 | 5/2007 | Ribeiro et al. |
| 7,224,206 B2 | 5/2007 | Pappalardo et al. |
| 7,233,135 B2 | 6/2007 | Noma et al. |
| 7,266,001 B1 | 9/2007 | Notohamiprodjo et al. |
| 7,292,013 B1 | 11/2007 | Chen et al. |
| 7,295,452 B1 | 11/2007 | Liu |
| 7,411,379 B2 | 8/2008 | Chu et al. |
| 7,414,371 B1 | 8/2008 | Choi et al. |
| 7,439,810 B2 | 10/2008 | Manicone et al. |
| 7,449,841 B2 | 11/2008 | Ball |
| 7,554,473 B2 | 6/2009 | Melanson |
| 7,567,091 B2 | 7/2009 | Farnworth et al. |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,834,553 B2 | 11/2010 | Hunt et al. |
| 7,859,488 B2 | 12/2010 | Kimura |
| 7,872,883 B1 | 1/2011 | Elbanhawy |
| 7,894,216 B2 | 2/2011 | Melanson |
| 8,008,898 B2 | 8/2011 | Melanson et al. |
| 8,169,806 B2 | 5/2012 | Sims et al. |
| 8,193,717 B2 | 6/2012 | Leiderman |
| 8,222,772 B1 | 7/2012 | Vinciarelli |
| 8,242,764 B2 | 8/2012 | Shimizu et al. |
| 8,248,145 B2 | 8/2012 | Melanson |
| 8,369,109 B2 | 2/2013 | Niedermeier et al. |
| 8,441,220 B2 | 5/2013 | Imura |
| 8,536,799 B1 | 9/2013 | Grisamore et al. |
| 8,610,364 B2 | 12/2013 | Melanson et al. |
| 2002/0082056 A1 | 6/2002 | Mandai et al. |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov et al. |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman et al. |
| 2006/0013026 A1 | 1/2006 | Frank et al. |
| 2006/0022648 A1 | 2/2006 | Ben-Yaakov et al. |
| 2006/0214603 A1 | 9/2006 | Oh et al. |
| 2007/0103949 A1 | 5/2007 | Tsuruya |
| 2007/0182347 A1 | 8/2007 | Shteynberg et al. |
| 2008/0018261 A1 | 1/2008 | Kastner |
| 2008/0043504 A1 | 2/2008 | Ye et al. |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0040796 A1* | 2/2009 | Lalithambika .... H02M 3/33507 363/21.17 |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Ferro |
| 2009/0295300 A1 | 12/2009 | King |
| 2010/0128501 A1 | 5/2010 | Huang et al. |
| 2010/0202165 A1 | 8/2010 | Zheng et al. |
| 2010/0238689 A1 | 9/2010 | Fei et al. |
| 2010/0244793 A1 | 9/2010 | Caldwell |
| 2011/0110132 A1 | 5/2011 | Rausch et al. |
| 2011/0199793 A1 | 8/2011 | Kuang et al. |
| 2011/0276938 A1 | 11/2011 | Perry et al. |
| 2011/0291583 A1 | 12/2011 | Shen |

(56) References Cited

U.S. PATENT DOCUMENTS

| | | |
|---|---|---|
| 2011/0298442 A1 | 12/2011 | Waltisperger et al. |
| 2011/0309760 A1 | 12/2011 | Beland et al. |
| 2012/0062131 A1 | 3/2012 | Choi et al. |
| 2012/0146540 A1 | 6/2012 | Khayat et al. |
| 2012/0182003 A1 | 7/2012 | Flaibani et al. |
| 2012/0187997 A1 | 7/2012 | Liao et al. |
| 2012/0212147 A1* | 8/2012 | Kuo ................. H02M 3/33507 315/219 |
| 2012/0248998 A1 | 10/2012 | Yoshinaga |
| 2012/0286686 A1* | 11/2012 | Watanabe .......... H05B 33/0815 315/224 |
| 2012/0286843 A1 | 11/2012 | Kurokawa |
| 2012/0320640 A1 | 12/2012 | Baurle et al. |
| 2013/0088902 A1 | 4/2013 | Dunipace |
| 2013/0107595 A1 | 5/2013 | Gautier et al. |
| 2013/0181635 A1 | 7/2013 | Ling |
| 2014/0218978 A1 | 8/2014 | Heuken et al. |

FOREIGN PATENT DOCUMENTS

| | | |
|---|---|---|
| EP | 1213823 A2 | 6/2002 |
| EP | 1289107 A2 | 3/2003 |
| EP | 1962263 A2 | 8/2008 |
| EP | 2232949 A2 | 9/2010 |
| EP | 2257124 A1 | 12/2010 |
| JP | 2008053181 A | 3/2008 |
| WO | 01/84697 A2 | 11/2001 |
| WO | 2004051834 A1 | 6/2004 |
| WO | 2006013557 A2 | 2/2006 |
| WO | 2006/022107 A1 | 3/2006 |
| WO | 2007016373 A2 | 2/2007 |
| WO | 2008004008 A2 | 1/2008 |
| WO | 2008152838 A1 | 12/2008 |
| WO | 2010011971 A1 | 1/2010 |
| WO | 2010065598 A2 | 6/2010 |
| WO | 2011008635 A1 | 1/2011 |

OTHER PUBLICATIONS

International Search Report and Written Opinion mailed Sep. 16, 2014, during examination of PCT/US2014/038507.
Severns, A New Improved and Simplified Proportional Base Drive Circuit, Proceedings of PowerCon 6, May 1979.
Ivanovic, Zelimir, "A low consumption proportional base drive circuit design for switching transistors", Proceedings of the Fifth International PCI '82 Conference: Sep. 28-30, 1982, Geneva, Switzerland.
Bell, David, "Designing optimal base drive for high voltage switching transistors", Proceeding of PowerCon7, 1980.
Marcelo Godoy Simões, "Power Bipolar Transistors", Chapter 5, Academic Press 2001, pp. 63-74.
Varga, L.D. and Losic, N.A., "Design of a high-performance floating power BJT driver with proportional base drive," Industry Applications Society Annual Meeting, 1989., Conference Record of the Oct. 1-5, 1989, IEEE, vol. I, pp. I186, 1189.
Skanadore, W.R., "Toward an understanding and optimal utilization of third-generation bipolar switching transistors", 1982 IEEE.
IC datasheet STR-S6707 through STR-S6709 by Sanken, copyright 1994, Allegro MicroSystems, Inc.
Avant et al., "Analysis of magnetic proportional drive circuits for bipolar junction transistors" PESC 1985, pp. 375-381.
Maksimovic, et al, Impact of Digital Control in Power Electronics, International Symposium on Power Semiconductor Devices and ICS, 2004, pp. 2-22, Boulder, Colorado, USA.
Fairchild Semiconductor, Ballast Control IC, FAN 7711, Rev. 1.0.3, 2007, pp. 1-23, San Jose, California, USA.
Yao, Gang et al, Soft Switching Circuit for Interleaved Boost Converters, IEEE Transactions on Power Electronics, vol. 22, No. 1, Jan. 2007, pp. 1-8, Hangzhou China.
STMicroelectronics, Transition Mode PFC Controller, Datasheet L6562, Rev. 8, Nov. 2005, pp. 1-16, Geneva, Switzerland.
Zhang, Wanfeng et al, A New Duty Cycle Control Strategy for Power Factor Correction and FPGA Implementation, IEEE Transactions on Power Electronics, vol. 21, No. 6, Nov. 2006, pp. 1-10, Kingston, Ontario, Canada.
STMicroelectronics, Power Factor Connector L6561, Rev 16, Jun. 2004, pp. 1-13, Geneva, Switzerland.
Texas Instruments, Avoiding Audible Noise at Light Loads When Using Leading Edge Triggered PFC Converters, Application Report SLUA309A, Mar. 2004—Revised Sep. 2004, pp. 1-4, Dallas, Texas, USA.
Texas Instruments, Startup Current Transient of the Leading Edge Triggered PFC Controllers, Application Report SLUA321, Jul. 2004, pp. 1-4, Dallas, Texas, USA.
Texas Instruments, Current Sense Transformer Evaluation UCC3817, Application Report SLUA308, Feb. 2004, pp. 1-3, Dallas, Texas, USA.
Texas Instruments, BiCMOS Power Factor Preregulator Evaluation Board UCC3817, User's Guide, SLUU077C, Sep. 2000—Revised Nov. 2002, pp. 1-10, Dallas, Texas, USA.
Texas Instruments, Interleaving Continuous Conduction Mode PFC Controller, UCC28070, SLUS794C, Nov. 2007—Revised Jun. 2009, pp. 1-45, Dallas, Texas, USA.
Texas Instruments, 350-W Two-Phase Interleaved PFC Pre-regulator Design Review, Application Report SLUA369B, Feb. 2005—Revised Mar. 2007, pp. 1-22, Dallas, Texas, USA.
Texas Instruments, Average Current Mode Controlled Power Factor Correction Converter using TMS320LF2407A, Application Report SPRA902A, Jul. 2005, pp. 1-15, Dallas, Texas, USA.
Texas Instruments, Transition Mode PFC Controller, UCC28050, UCC28051, UCC38050, UCC38051, Application Note SLUS515D, Sep. 2002—Revised Jul. 2005, pp. 1-28, Dallas, Texas, USA.
Unitrode, High Power-Factor Preregulator, UC1852, UC2852, UC3852, Feb. 5, 2007, pp. 1-8, Merrimack, Maine, USA.
Unitrode, Optimizing Performance in UC3854 Power Factor Correction Applications, Design Note ON 39E, 1999, pp. 1-6, Merrimack, Maine, USA.
ON Semiconductor Four Key Steps to Design a Continuous Conduction Mode PFC Stage Using the NCP1653, Application Note AND8184/D, Nov. 2004, pp. 1-8, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, Texas, USA.
Unitrode, UC3854AIB and UC3855A!B Provide Power Limiting with Sinusoidal Input Current for PFC Front Ends, SLUA196A, Design Note DN-66, Jun. 1995—Revised Nov. 2001, pp. 1-6, Merrimack, Maine, USA.
Unitrode, Programmable Output Power Factor Preregulator, UCC2819, UCC3819, SLUS482B, Apr. 2001—Revised Dec. 2004, pp. 1-16, Merrimack, Maine, USA.
Texas Instruments, UCC281019, 8-Pin Continuous Conduction Mode (CCM) PFC Controller, SLU828B, Revised Apr. 2009, pp. 1-48, Dallas, Texas, USA.
http://toolbarpdf.com/docs/functions-and-features-of=inverters. html, Jan. 20, 2011, pp. 1-8.
Zhou, Jinghai, et al, Novel Sampling Algorithm for DSP Controlled 2kW PFC Converter, IEEE Transactions on Power Electronics, vol. 16, No. 2, Mar. 2001, pp. 1-6, Hangzhou, China.
Mammano, Bob, Current Sensing Solutions for Power Supply Designers, Texas Instruments, 2001, pp. 1-36, Dallas, Texas, USA.
Fairchild Semiconductor, Ballast Control IC FAN7532, Rev. 1.0.3, Jun. 2006, pp. 1-16, San Jose, California, USA.
Fairchild Semiconductor, Simple Ballast Controller, FAN7544, Rev. 1.0.0, Sep. 21, 2004, pp. 1-14, San Jose, California, USA.
Texas Instruments, High Performance Power Factor Preregulator, UC2855A/B and UC3855A/B, SLUS328B, Jun. 1998, Revised Oct. 2005, pp. 1-14, Dallas, TX, USA.
Balogh, Laszlo, et al, Power-Factor Correction with Interleaved Boost Converters in Continuous-Inductr-Current Mode, 1993, IEEE, pp. 168-174, Switzerland.
Cheng, Hung L., et al, A Novel Single-Stage High-Power-Factor Electronic Ballast with Symmetrical Topology, Power Electronics and Motion Control Conference, 2006. IPEMC 2006. CES/IEEE

(56) References Cited

OTHER PUBLICATIONS

5th International, Aug. 14-16, 2006, vol. 50, No. 4, Aug. 2003, pp. 759-766, Nat. Ilan Univ., Taiwan.
Fairchild Semiconductor. Theory and Application of the ML4821 Average Current Mode PFC Controllerr, Fairchild Semiconductor Application Note 42030. Rev. 1.0, Oct. 25, 2000, pp. 1-19, San Jose, California, USA.
Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.
Infineon Technologies AG, Standalone Power Factor Correction (PFC) Controller in Continuous Conduction Mode (CCM), Infineon Power Management and Supply, CCM-PFC, ICE2PCS01, ICE2PCS01 G, Version 2.1, Feb. 6, 2007, p. 1-22, Munchen, Germany.
Lu, et al, Bridgeless PFC Implementation Using One Cycle Control Technique, International Rectifier, 2005, pp. 1-6, Blacksburg, VA, USA.
Brown, et al, PFC Converter Design with IR1150 One Cycle Control IC, International Rectifier, Application Note AN-1 077, pp. 1-18, El Segundo CA, USA.
International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.
International Rectifier, IRAC1150=300W Demo Board, User's Guide, Rev 3.0, International Rectifier Computing and Communications SBU-AC-DC Application Group, pp. 1-18, Aug. 2, 2005, El Segundo, CO USA.
Lai, Z., et al, A Family of Power-Factor-Correction Controller, Applied Power Electronics Conference and Exposition, 1997. APEC '97 Conference Proceedings 1997., Twelfth Annual, vol. 1, pp. 66-73, Feb. 23-27, 1997, Irvine, CA.
Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Horn, Kowloon, Hong Kong.
Linear Technology, Single Switch PWM Controller with Auxiliary Boost Converter, Linear Technology Corporation, Data Sheet LT 1950, pp. 1-20, Milpitas, CA, USA.
Linear Technology, Power Factor Controller, Linear Technology Corporation, Data Sheet LT1248, pp. 1-12, Milpitas, CA, USA.
Supertex, Inc., HV9931 Unity Power Factor LED Lamp Driver, Supertex, Inc., Application Note AN-H52, 2007, pp. 1-20, Sunnyvale, CA, USA.
Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.
Erickson, Robert W., et al, Fundamentals of Power Electronics, Second Edition, Chapter 6, 2001, pp. 131-184, Boulder CO, USA.
STMicroelectronics, CFL/TL Ballast Driver Preheat and Dimming L6574, Sep. 2003, pp. 1-10, Geneva, Switzerland.
Fairchild Semiconductor, 500W Power-Factor-Corrected (PFC) Converter Design with FAN4810, Application Note 6004, Rev. 1.0.1, Oct. 31, 2003, pp. 1-14, San Jose, CA, USA.
Fairfield Semiconductor, Power Factor Correction (PFC) Basics, Application Note 42047, Rev. 0.9.0, Aug. 19, 2004, pp. 1-11, San Jose, CA, USA.
Fairchild Semiconductor, Design of Power Factor Correction Circuit Using FAN7527B, Application Note AN4121, Rev. 1.0.1, May 30, 2002, pp. 1-12, San Jose, CA, USA.
Fairchild Semiconductor, Low Start-Up Current PFC/PWM Controller Combos FAN4800, Rev. 1.0.6, Nov. 2006, pp. 1-20, San Jose, CA, USA.
Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Fairchild Semiconductor, ZVS Average Current PFC Controller FAN 4822, Rev. 1.0.1, Aug. 10, 2001, pp. 1-10, San Jose, CA, USA.
Prodic, et al, Dead-Zone Digital Controller for Improved Dynamic Response of Power Factor Preregulators, Applied Power Electronics Conference and Exposition, 2003, vol. 1, pp. 382-388, Boulder CA, USA.
Philips Semiconductors, 90W Resonant SMPS with TEA 1610 Swing Chip, Application Note AN99011, Sep. 14, 1999, pp. 1-28, The Netherlands.
Fairchild Semiconductor, Power Factor Correction Controller FAN7527B, Aug. 16, 2003, pp. 1-12, San Jose, CA, USA.
ON Semiconductor, Power Factor Controller for Compact and Robust, Continuous Conduction Mode Pre-Converters, NCP1654, Mar. 2007, Rev. PO, pp. 1-10, Denver, CO, USA.
Fairchild Semicondctor, Simple Ballast Controller, KA7541, Rev. 1.0.3, Sep. 27, 2001, pp. 1-14, San Jose, CA, USA.
Fairchild Semiconductor, Power Factor Controller, ML4812, Rev. 1.0.4, May 31, 2001, pp. 1-18, San Jose, CA, USA.
Prodic, et al, Digital Controller for High-Frequency Rectifiers with Power Factor Correction Suitable for On-Chip Implementation, Power Conversion Conference—Nagoya, 2007. PCC '07, Apr. 2-5, 2007, pp. 1527-1531, Toronto, Canada.
Freescale Semiconductor, Dimmable Light Ballast with Power Factor Correction, Designer Reference Manual, DRM067, Rev. 1, Dec. 2005, M681-1C08 Microcontrollers, pp. 1-72, Chandler, AZ, USA.
Freescale Semiconductor, Design of Indirect Power Factor Correction Using 56F800/E, Freescale Semiconductor Application Note, AN1965, Rev. 1, Jul. 2005, pp. 1-20, Chandler, AZ, USA.
Freescale Semiconductor, Implementing PFC Average Current Mode Control using the MC9S12E128, Application Note AN3052, Addendum to Reference Design Manual DRM064, Rev. 0, Nov. 2005, pp. 1-8, Chandler, AZ, USA.
Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.
Madigan, et al, Integrated High-Quality Rectifier-Regulators, Industrial Electronics, IEEE Transactions, vol. 46, Issue 4, pp. 749-758, Aug. 1999, Cary, NC, USA.
Renesas, Renesas Technology Releases Industry's First Critical-Conduction-Mode Power Factor Correction Control IC Implementing Interleaved Operations, R2A20112, pp. 1-4, Dec. 18, 2006, Tokyo, Japan.
Renesas, PFC Control IC R2A20111 Evaluation Board, Application Note R2A20111 EVB, all pages, Feb. 2007, Rev. 1.0, pp. 1-39, Tokyo, Japan.
Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.
Noon, Jim, High Performance Power Factor Preregulator UC3855A!B, Texas Instruments Application Report, SLUA146A, May 1996—Revised Apr. 2004, pp. 1-35, Dallas TX, USA.
NXP Semiconductors, TEA1750, GreenChip III SMPS Control IC Product Data Sheet, Rev.01, Apr. 6, 2007, pp. 1-29, Eindhoven, The Netherlands.
Turchi, Joel, Power Factor Correction Stages Operating in Critical Conduction Mode, ON Semiconductor, Application Note AND8123/D, Sep. 2003—Rev. 1 , pp. 1-20, Denver, CO, USA.
ON Semiconductor, Greenline Compact Power Factor Controller: Innovative Circuit for Cost Effective Solutions, MC33260, Semiconductor Components Industries, Sep. 2005—Rev. 9, pp. 1-22, Denver, CO, USA.
ON Semiconductor, Enhanced, High Voltage and Efficient Standby Mode, Power Factor Controller, NCP1605, Feb. 2007, Rev. 1, pp. 1-32, Denver, CO, USA.
ON Semiconductor, Cost Effective Power Factor Controller, NCP1606, Mar. 2007, Rev. 3, pp. 1-22, Denver, CO, USA.
Renesas, Power Factor Correction Controller IC, HA16174P/FP, Rev. 1.0, Jan. 6, 2006, pp. 1-38, Tokyo, Japan.

(56) References Cited

OTHER PUBLICATIONS

STMicroelectronics, Electronic Ballast with PFC using L6574 and L6561. Application Note AN993, May 2004, pp. 1-20, Geneva, Switzerland.

STMicroelectronics, Advanced Transition-Mode PFC Controller L6563 and L6563A, Mar. 2007, pp. 1-40, Geneva, Switzerland.

Su, et al, "Ultra Fast Fixed-Frequency Hysteretic Buck Converter with Maximum Charging Current Control and Adaptive Delay Compensation for DVS Applications", IEEE Journal of Solid-Slate Circuits, vol. 43, No. 4, Apr. 2008, pp. 815-822, Hong Kong University of Science and Technology, Hong Kong, China.

Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.

Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.

International Search Report, PCT/US2012/069942, European Patent Office, Jul. 21, 2014, pp. 1-5.

Written Opinion, PCT/US2012/069942, European Patent Office, Jul. 21, 2014, pp. 1-8.

International Search Report, PCT/US2014/021921, European Patent Office, Jun. 23, 2014, pp. 1-3.

Written Opinion, PCT/US2014/021921, European Patent Office, Jun. 23, 2014, pp. 1-5.

\* cited by examiner

SWITCH-MODE DRIVE SENSING OF REVERSE RECOVERY IN BIPOLAR JUNCTION TRANSISTOR (BJT)-BASED POWER CONVERTERS

CROSS-REFERENCE TO RELATED APPLICATIONS

This application is related by subject matter to U.S. patent application Ser. No. 14/280,539 to John Melanson et al. filed May 16, 2014 and entitled "Charge Pump-Based Drive Circuitry for Bipolar Junction Transistor (BJT)-based Power Supply" and is related by subject matter to U.S. patent application Ser. No. 14/280,474 to Ramin Zanbaghi et al. filed May 16, 2014 and entitled "Single Pin Control of Bipolar Junction Transistor (BJT)-based Power Stage," and is related by subject matter to U.S. patent application Ser. No. 14/341,984 to Melanson et al. filed Jul. 28, 2014, and entitled "Compensating for a Reverse Recovery Time Period of the Bipolar Junction Transistor (BJT) in Switch-Mode Operation of a Light-Emitting Diode (LED)-based Bulb," and is related by subject matter to U.S. patent application Ser. No. 13/715,914 to Siddharth Maru filed Dec. 14, 2012 and entitled "Multi-Mode Flyback Control For a Switching Power Converter," and is related to U.S. patent application Ser. No. 14/444,087 to Siddharth Maru et al. filed Jul. 28, 2014, and entitled "Two Terminal Drive of Bipolar Junction Transistor (BJT) for Switch-Mode Operation of a Light Emitting Diode (LED)-Based Bulb," and is related by subject matter to U.S. patent application Ser. No. 14/624,475 to Shatam Agarwal et al. and entitled "Resistance Measurement of a Resistor in a Bipolar Junction Transistor (BJT)-Based Power Stage," each of which is incorporated by reference.

FIELD OF THE DISCLOSURE

The instant disclosure relates to power supply circuitry. More specifically, this disclosure relates to power supply circuitry for lighting devices.

BACKGROUND

Alternative lighting devices to replace incandescent light bulbs differ from incandescent light bulbs in the manner that energy is converted to light. Incandescent light bulbs include a metal filament. When electricity is applied to the metal filament, the metal filament heats up and glows, radiating light into the surrounding area. The metal filament of conventional incandescent light bulbs generally has no specific power requirements. That is, any voltage and any current may be applied to the metal filament, because the metal filament is a passive device. Although the voltage and current need to be sufficient to heat the metal filament to a glowing state, any other characteristics of the delivered energy to the metal filament do not affect operation of the incandescent light bulb. Thus, conventional line voltages in most residences and commercial buildings are sufficient for operation of the incandescent bulb.

However, alternative lighting devices, such as compact fluorescent light (CFL) bulbs and light emitting diode (LED)-based bulbs, contain active elements that interact with the energy supply to the light bulb. These alternative devices are desirable for their reduced energy consumption, but the alternative devices have specific requirements for the energy delivered to the bulb. For example, compact fluorescent light (CFL) bulbs often have an electronic ballast designed to convert energy from a line voltage to a very high frequency for application to a gas contained in the CFL bulb, which excites the gas and causes the gas to glow. In another example, light emitting diode (LEDs)-based bulbs include a power stage designed to convert energy from a line voltage to a low voltage for application to a set of semiconductor devices, which excites electrons in the semiconductor devices and causes the semiconductor devices to glow. Thus, to operate either a CFL bulb or LED-based bulb, the line voltage must be converted to an appropriate input level for the lighting device of a CFL bulb or LED-based bulb. Conventionally, a power stage is placed between the lighting device and the line voltage to provide this conversion. Although a necessary component, this power stage increases the cost of the alternate lighting device relative to an incandescent bulb.

One conventional power stage configuration is the buck-boost power stage. FIG. 1 is a circuit schematic showing a buck-boost power stage for a light-emitting diode (LED)-based bulb. An input node 102 receives an input voltage, such as line voltage, for a circuit 100. The input voltage is applied across an inductor 104 under control of a switch 110 coupled to ground. When the switch 110 is activated, current flows from the input node 102 to the ground and charges the inductor 104. A diode 106 is coupled between the inductor 104 and light emitting diodes (LEDs) 108. When the switch 110 is deactivated, the inductor 104 discharges into the light emitting diodes (LEDs) 108 through the diode 106. The energy transferred to the light emitting diodes (LEDs) 108 from the inductor 104 is converted to light by LEDs 108.

The conventional power stage configuration of FIG. 1 provides limited control over the conversion of energy from a source line voltage to the lighting device. The only control available is through operation of the switch 110 by a controller. However, that controller would require a separate power supply or power stage circuit to receive a suitable voltage supply from the line voltage. Additionally, the switch 110 presents an additional expense to the light bulb containing the power stage. Because the switch 110 is coupled to the line voltage, which may be approximately 120-240 Volts RMS with large variations, the switch 110 must be a high voltage switch, which are large, difficult to incorporate into small bulbs, and expensive.

Shortcomings mentioned here are only representative and are included simply to highlight that a need exists for improved power stages, particularly for lighting devices and consumer-level devices. Embodiments described here address certain shortcomings but not necessarily each and every one described here or known in the art.

SUMMARY

A bipolar junction transistor (BJT) may be used as a switch for controlling a power stage of a lighting device, such as a light-emitting diode (LED)-based light bulb. Bipolar junction transistors (BJTs) may be suitable for high voltage applications, such as for use in the power stage and for coupling to a line voltage. Further, bipolar junction transistors (BJTs) are lower cost devices than conventional high voltage field effect transistors (HV FETs). Thus, implementations of power stages having bipolar junction transistor (BJT) switches may be lower cost than power stage implementations having field effect transistor (FET) switches.

According to one embodiment, a method may include driving a base current from a base current source to a base of a bipolar junction transistor (BJT) to maintain conduction of the bipolar junction transistor (BJT) during a first time period; disconnecting the base current source from the bipolar junction transistor (BJT) for a second time period, wherein the second time period comprises a reverse recovery time period during which the bipolar junction transistor (BJT) remains conducting while the base current source is disconnected; and/or detecting an end of the reverse recovery time period by monitoring a voltage at the base of the bipolar junction transistor (BJT).

In some embodiments, the method may also include detecting de-energization of the energy storage device during the second time period; repeating the step of driving the base current after detecting the de-energization; measuring a turn-on delay of the bipolar junction transistor when repeating the step of driving the base current; and/or again repeating the step of driving the base current by coupling the base current source to the base of the bipolar junction transistor (BJT) a time prior to approximately a minimum voltage at the collector of the bipolar junction transistor (BJT), wherein the time prior is based, at least in part, on the measured turn-on delay.

In certain embodiments, the step of detecting the end of the reverse recovery time period may include detecting the base voltage is at least 2 Volts below a supply voltage; the step of driving the base current maintains conduction of the bipolar junction transistor (BJT) to charge an energy storage device coupled to a load; the step of detecting de-energization of the energy storage device may include detecting a zero current through the energy storage device; the step of detecting the zero current comprises detecting the zero current at the base of the bipolar junction transistor (BJT); the step of detecting de-energization may include coupling a resistor to the base of the bipolar junction transistor (BJT) to form a high pass filter (HPF) with a capacitor, wherein the capacitor is coupled to the base of the bipolar junction transistor (BJT) and an emitter of the bipolar junction transistor (BJT); the high pass filter (HPF) may include at least one pole, and in some embodiments all poles, at a frequency greater than an expected oscillation frequency of a voltage at a collector of the bipolar junction transistor (BJT) when the energy storage device is de-energized; the step of detecting de-energization may include detecting a ringing voltage at a collector of the bipolar junction transistor (BJT); the step of repeating the step of driving the base current may include coupling the base current source to the base of the bipolar junction transistor (BJT) prior to approximately a minimum voltage at the collector of the bipolar junction transistor (BJT) during the detected ringing; and/or the step of coupling the base current source prior to approximately a minimum voltage may include coupling the base current source a fixed delay offset duration prior to approximately the minimum voltage.

According to another embodiment, an apparatus may include a controller configured to couple to a base of a bipolar junction transistor (BJT), wherein the controller is configured to perform one or more of the steps comprising: driving a base current from a base current source to a base of a bipolar junction transistor (BJT) to maintain conduction of the bipolar junction transistor (BJT) during a first time period; disconnecting the base current source from the bipolar junction transistor (BJT) for a second time period, wherein the second time period comprises a reverse recovery time period during which the bipolar junction transistor (BJT) remains conducting while the base current source is disconnected; and/or detecting an end of the reverse recovery time period by monitoring a voltage at the base of the bipolar junction transistor (BJT).

In some embodiments, the step of detecting the end of the reverse recovery time period may include detecting the base voltage is at least 2 Volts below a supply voltage; the step of driving the base current may maintain conduction of the bipolar junction transistor (BJT) to charge an energy storage device coupled to a load; the step of detecting de-energization of the energy storage device may include detecting a zero current through the energy storage device; the step of detecting the zero current may include detecting the zero current at the base of the bipolar junction transistor (BJT); the step of detecting de-energization may include coupling a resistor to the base of the bipolar junction transistor (BJT) to form a high pass filter (HPF) with a capacitor; the capacitor may be coupled to the base of the bipolar junction transistor (BJT) and an emitter of the bipolar junction transistor (BJT); the high pass filter (HPF) may include at least one pole, and in some embodiments all poles, at a frequency greater than an expected oscillation frequency of a voltage at a collector of the bipolar junction transistor (BJT) when the energy storage device is de-energized; the step of detecting de-energization may include detecting a ringing voltage at a collector of the bipolar junction transistor (BJT); the step of repeating the step of driving the base current may include coupling the base current source to the base of the bipolar junction transistor (BJT) prior to approximately a minimum voltage at the collector of the bipolar junction transistor (BJT) during the detected ringing; and/or the step of coupling the base current source prior to approximately a minimum voltage may include coupling the base current source a fixed delay offset duration prior to approximately the minimum voltage.

In certain embodiments, the controller is further configured to perform one or more of the steps of: detecting de-energization of the energy storage device during the second time period; and repeating the step of driving the base current after detecting the de-energization; measuring a turn-on delay of the bipolar junction transistor when repeating the step of driving the base current; and/or again repeating the step of driving the base current by coupling the base current source to the base of the bipolar junction transistor (BJT) a time prior to approximately a minimum voltage at the collector of the bipolar junction transistor (BJT), wherein the time prior is based, at least in part, on the measured turn-on delay.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A bipolar junction transistor (BJT) may control delivery of power to a lighting device, such as light emitting diodes (LEDs). The bipolar junction transistor (BJT) may be coupled to a high voltage source, such as a line voltage, and may control delivery of power to the LEDs. The bipolar junction transistor (BJT) is a low cost device that may reduce the price of alternative light bulbs. In some embodiments, a controller for regulating energy transfer from an input voltage, such as a line voltage, to a load, such as the LEDs, may be coupled to the BJT through two terminals. For example, the controller may regulate energy transfer by coupling to a base of the BJT and an emitter of the BJT. The controller may obtain input from the base and/or emitter of the BJT and apply control signals to a base and/or emitter of the BJT.

Figure 1:
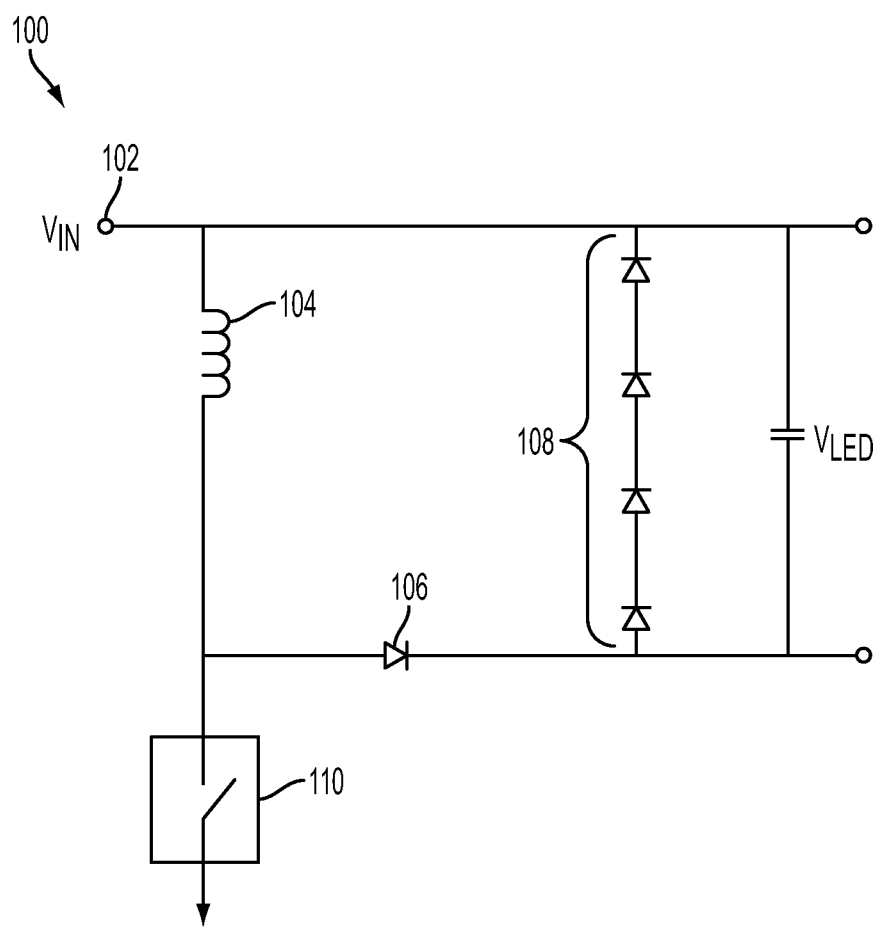
FIG. 1 is an example circuit schematic illustrating a buck-boost power stage for a light-emitting diode (LED)-based bulb in accordance with the prior art.
Figure 2:
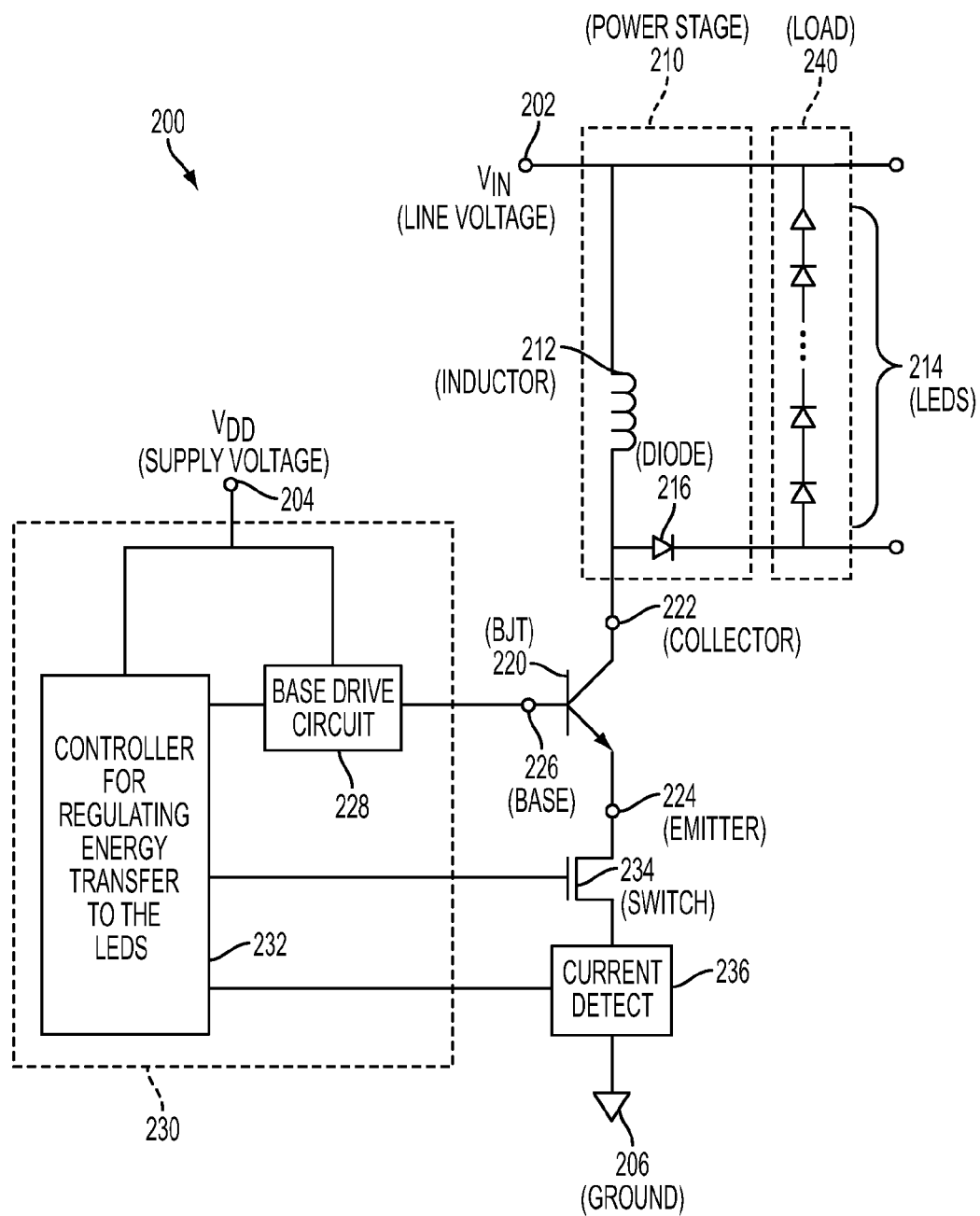
FIG. 2 is an example circuit schematic illustrating a power stage having an emitter-controlled bipolar junction transistor (BJT) according to one embodiment of the disclosure.

FIG. 2 is an example circuit schematic illustrating a power stage having an emitter-controlled bipolar junction transistor (BJT) according to one embodiment of the disclosure. A circuit 200 may include a bipolar junction transistor (BJT) 220 having a collector node 222, an emitter node 224, and a base node 226. The collector 222 may be coupled to a high voltage input node 202 and a lighting load 214, such as a plurality of light emitting diodes (LEDs). An inductor 212 and a diode 216 may be coupled between the high voltage input node 202 and the lighting load 214. The inductor 212 and the diode 216 and other components (not shown) may be part of a power stage 210. The LEDs 214 may generically be any load 240.

Figure 3:
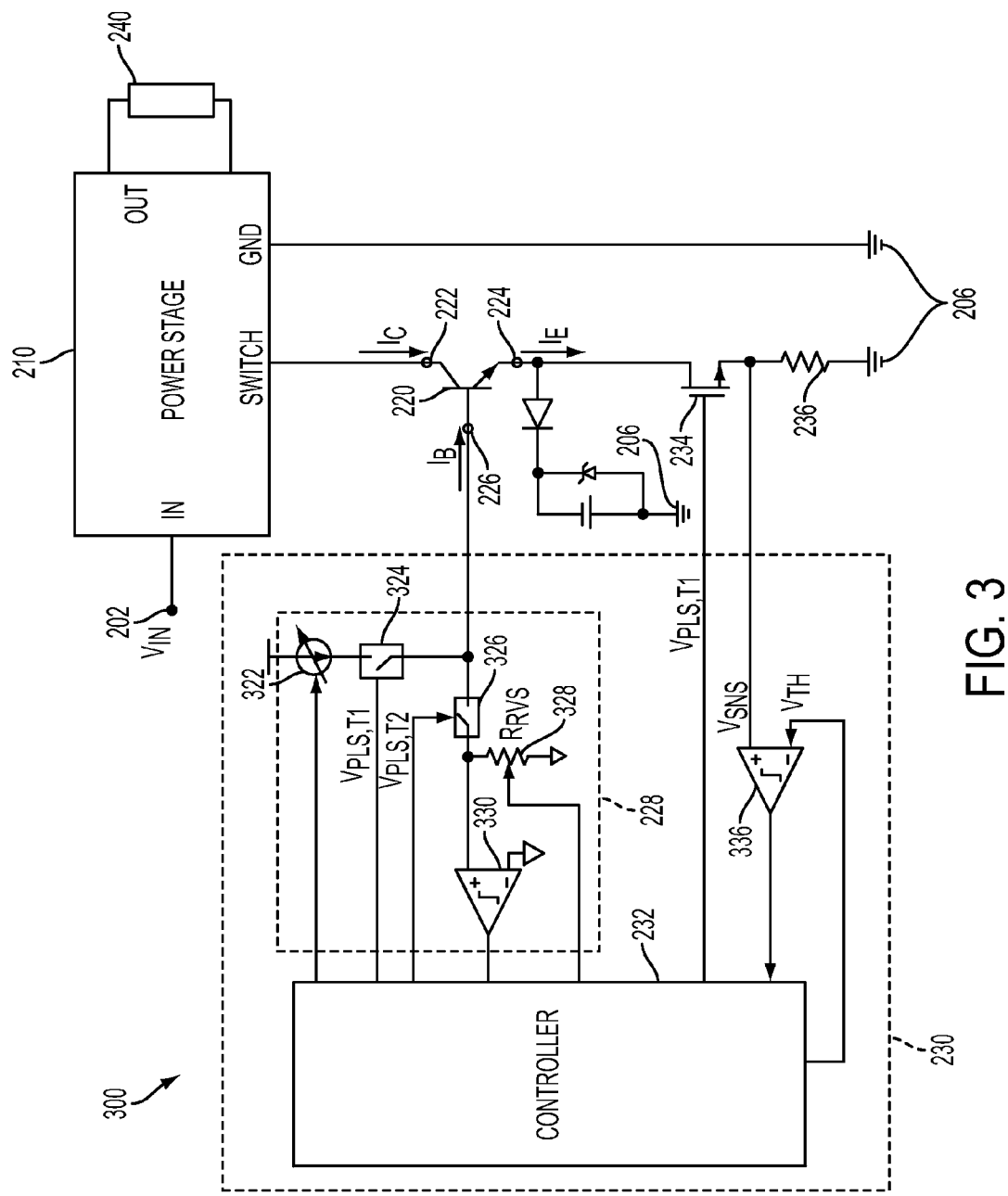
FIG. 3 is an example circuit schematic illustrating control of a bipolar junction transistor (BJT) through two terminals according to one embodiment of the disclosure.

The emitter node 224 of the BJT 220 may be coupled to an integrated circuit (IC) 230 through a switch 234, and a current detect circuit 236. The switch 234 may be coupled in a current path from the emitter node 224 to a ground 206. The current detect circuit 236 may be coupled between the switch 234 and the ground 206. The controller 232 may control power transfer from the input node 202 to the lighting load 214 by operating the switch 234 to couple and/or disconnect the emitter node 224 of the BJT 220 to the ground 206. The current detect circuit 236 may provide feedback to the controller 232 regarding current flowing through the BJT 220 while the switch 234 is turned on to couple the emitter node 224 to the ground 206. As shown in FIG. 3, the switch 234 and the current detect circuit 236, such as a resistor 236, are not part of the IC 230. In another embodiment, the switch 234 and the resistor 236 may be part of the IC 230 and integrated with the controller 232 and other components such as those shown in FIG. 2.

The base node 226 of the BJT 220 may also be coupled to the IC 230, such as through a base drive circuit 228. The base drive circuit 228 may be configured to provide a relatively fixed bias voltage to the base node 226 of the BJT 220, such as during a time period when the switch 234 is switched on. The base drive circuit 228 may also be configured to dynamically adjust base current to the BJT 220 under control of the controller 232. The base drive circuit 228 may be controlled to maintain conduction of the BJT 220 for a first time period. The base drive circuit 228 may be disconnected from the BJT 220 to begin a second flyback time period with the turning off of the BJT 220.

The controller 232 may control delivery of power to the lighting load 214 in part through the switch 234 at the emitter node 224 of the BJT 220. When the controller 232 turns on the switch 234, current flows from the high voltage input node 202, through the inductor 212, the BJT 220, and the switch 234, to the ground 206. During this time period, the inductor 212 charges from electromagnetic fields generated by the current flow. When the controller 232 turns off the switch 234, current flows from the inductor 212, through the diode 216, and through the lighting load 214 after a reverse recovery time period of the BJT 220 completes and a sufficient voltage accumulates at collector node 222 to forward bias diode 216 of the power stage 210. The lighting load 214 is thus powered from the energy stored in the inductor 212, which was stored during the first time period when the controller 232 turned on the switch 234. The controller 232 may repeat the process of turning on and off the switch 234 to control delivery of energy to the lighting load 214. Although the controller 232 operates switch 234 to start a conducting time period for the BJT 220 and to start a turn-off transition of the BJT 220, the controller 232 may not directly control conduction of the BJT 220. Control of delivery of energy from a high voltage source may be possible in the circuit 200 without exposing the IC 230 or the controller 232 to the high voltage source.

The controller 232 may determine the first duration of time to hold the switch 234 on and the second duration of time to hold the switch 234 off based on feedback from the current detect circuit 236. For example, the controller 232 may turn off the switch 234 after the current detect circuit 236 detects current exceeding a first current threshold. A level of current detected by the current detect circuit 236 may provide the controller 232 with information regarding a charge level of the inductor 212. By selecting the first duration of the time and the second duration of time, the controller 232 may regulate an average current output to the LEDs 214.

Additional details for one configuration of the IC 230 are shown in FIG. 3. FIG. 3 is an example circuit schematic illustrating control of a bipolar junction transistor (BJT) through two terminals according to one embodiment of the disclosure. A circuit 300 may include, within the IC 230, a forward base current source 322 coupled to the base node 226 by a forward base switch 324. The current source 322 may provide a variable base current adjustable by the controller 232. The switch 324 may be switched on by the controller 232 with a control signal $V_{PLS,T1}$. The control signal $V_{PLS,T1}$ may also be applied to the switch 234 at the emitter of the BJT 220. As described above, the switch 234 may be turned on to charge the power stage 210 during a first time period. The switch 324 may also be turned on during the same time period, and current from the source 322 applied to the BJT 220 to allow the BJT 220 to remain turned on and in a conducting state. In one embodiment, the controller 232 may also control the current source 322 to increase a base current to the BJT 220 proportional to an increase in collector current through the BJT 220. The $V_{PLS,T1}$ control signal may be generated by monitoring a current detect resistor 236 with a comparator 336. For example, when the current sensed by resistor 236 reaches a threshold voltage, $V_{th}$, the comparator 336 output may switch states and the controller 232 may then switch a state of the $V_{PLS,T1}$ control signal.

The reverse recovery time period described above may be dynamically adjusted. The adjustments may be based, in part, on a condition, such as voltage level, at a base 226 of the BJT 220. The adjustments may be performed by, for example, controlling the forward base current source 322 of FIG. 3. The reverse recovery time period may also be controlled with a reverse base current source as illustrated in FIG. 4.

Figure 4:
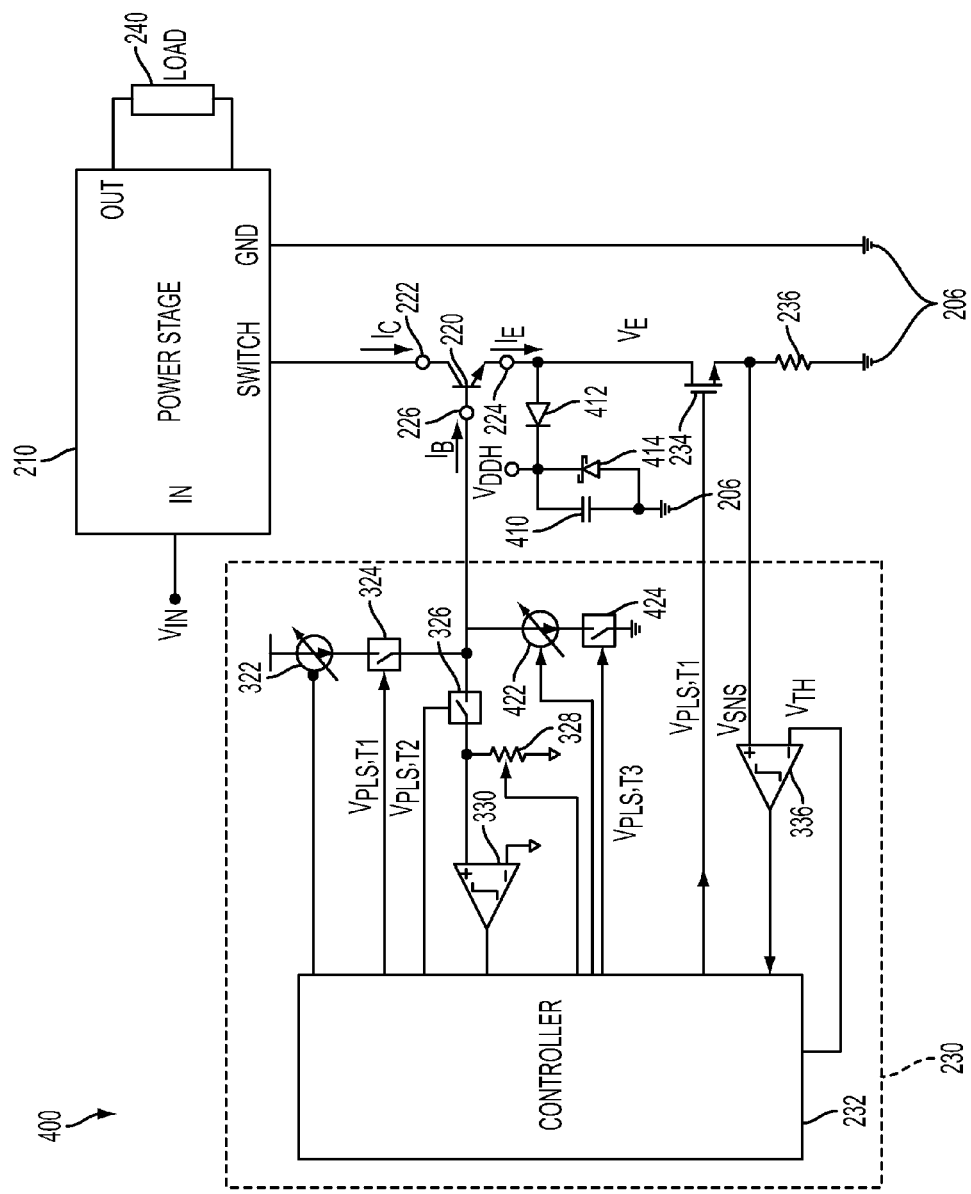
FIG. 4 is an example circuit schematic illustrating control of a bipolar junction transistor (BJT) with a forward and a reverse base current source according to one embodiment of the disclosure.

FIG. 4 is an example circuit schematic illustrating control of a bipolar junction transistor (BJT) with a forward and a reverse base current source according to one embodiment of the disclosure. A circuit 400 may be similar to the circuit 300 of FIG. 3, but may also include a reverse base current source 422 and a second reverse base switch 424. The switch 424 may be controlled by a $V_{PLS,T3}$ control signal generated by the controller 232. The controller 232 may switch on the switch 424 and control the current source 422 during a portion of or the entire reverse recovery time period of the BJT 220 to adjust the duration of the reverse recovery time period. In the circuit 400, the reverse recovery time period may thus be controlled by varying the resistor 328 and/or controlling the current source 422. The use of current source 422 may be advantageous over varying the resistor 328 in certain embodiments by allowing the controller 232 to set a current output level without measuring the base voltage of the BJT 220. For example, the controller 232 may set the current source 422 to a value proportional to the collector current $I_C$ to reduce the reverse recovery time period.

Figure 5:
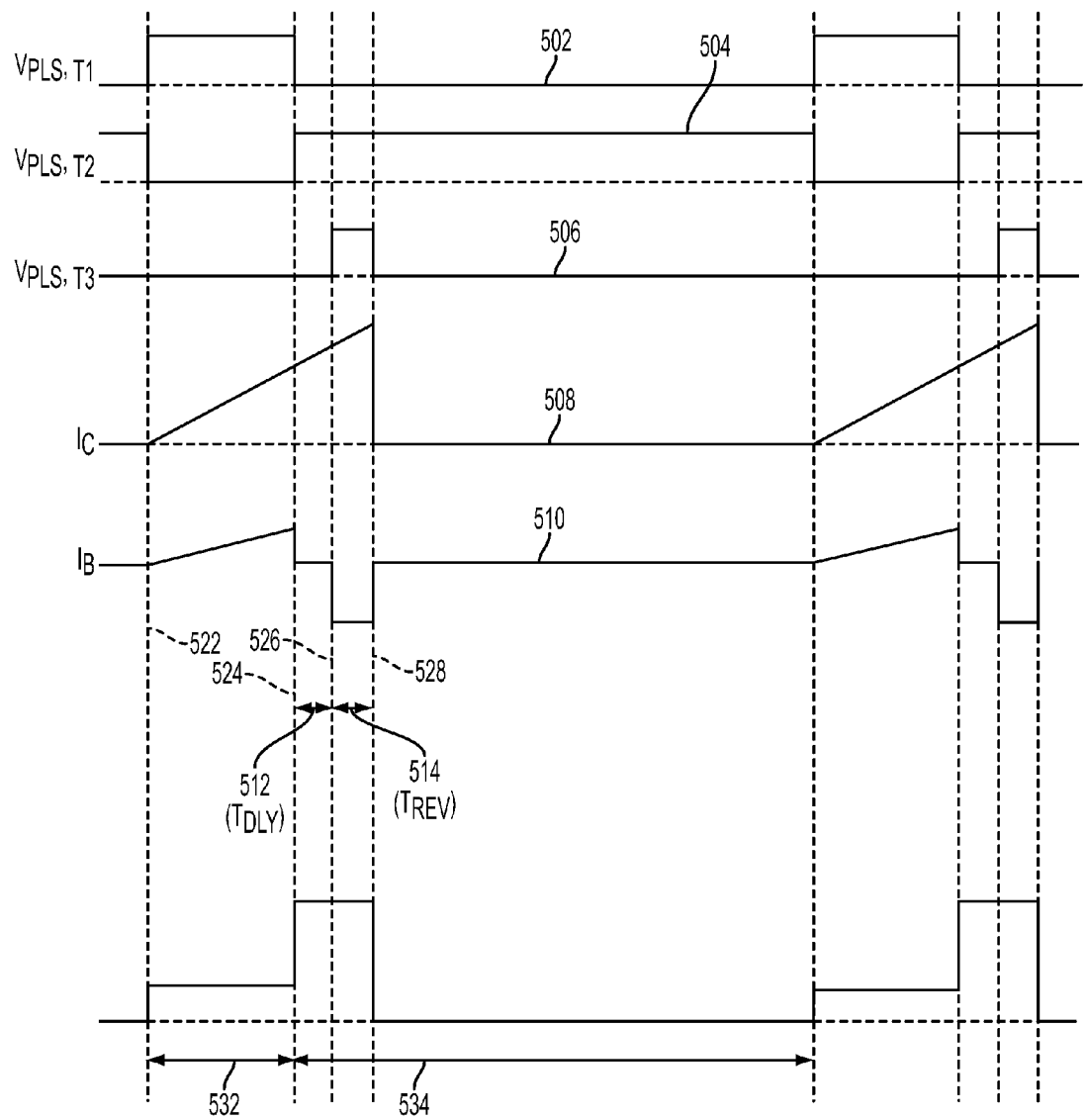
FIG. 5 are example graphs illustrating dynamic adjustment of a reverse recovery period by a controller with a reverse base current source according to one embodiment of the disclosure.

One example of operation of the circuit of FIG. 4 is shown in the graphs of FIG. 5. FIG. 5 are example graphs illustrating dynamic adjustment of a reverse recovery period by a controller with a reverse base current source according to one embodiment of the disclosure. Lines 502, 504, and 506 represent control signals $V_{PLS,T1}$, $V_{PLS,T2}$, and $V_{PLS,T3}$, respectively, generated by the controller 232. At time 522, the $V_{PLS,T1}$ signal switches high and the $V_{PLS,T2}$ signal switches low to turn on the BJT 220. While the BJT 220 is on, the collector current $I_C$ shown in line 508 may linearly increase, and the controller 232 may dynamically adjust a base current $I_B$ shown in line 510 proportionally to the collector current $I_C$. At time 524, the $V_{PLS,T1}$ signal switches low to turn off the base current source and begin turning off of the BJT 220. Also at time 524, the $V_{PLS,T2}$ signal switches high to couple the resistor 328 to the BJT 220 and allow measurement of the reverse base current and thus detection of the end of the reverse recovery time period. The controller 232 may then wait a time period $T_{DLY}$ 512 before switching the $V_{PLS,T3}$ signal to high at time 526 to couple the reverse base current source 422 to the BJT 220. In one embodiment, the current source 422 may be configured by the controller 232 to provide a current of between approximately 10% and 50% of the collector current $I_C$. The controller 232 may hold the $V_{PLS,T3}$ signal high for time period $T_{REV}$ 514 to quickly discharge base charge from the BJT 220 to turn off the BJT 220. Although shown in FIG. 5 as a constant negative base current $I_B$ during time period 514, the negative base current may be varied by the controller 232 adjusting the base current source 422. The controller 232 may then switch the $V_{PLS,T3}$ signal to low when the reverse base current reaches zero, such as may be measured by the sense amplifier 330. After time 528, the controller 232 may wait a delay period before repeating the sequence of times 522, 524, 526, and 528. The controller may repeat first time period 532 and second time period 534 to obtain a desired average current output to a load. Power is output to the load 240 during a portion of the second time period 534 following the reverse recovery time periods 512 and 514. By controlling the durations of the first time period 532, the reverse recovery time periods 512 and 514, and the second time period 534, the controller 232 may regulate the average output current to the load 240.

During the time period $T_{DLY}$ 512, a supply capacitor may be charged from current conducted through the BJT 220 during the reverse recovery time period. For example, a capacitor 410 may be coupled to an emitter node 224 of the BJT 220 through a diode 412 and Zener diode 414. The capacitor 414 may be used, for example, to provide a supply voltage to the controller 232. By adjusting a duration of the time period $T_{DLY}$ 512, the controller 232 may adjust a charge level on the capacitor 410 and thus a supply voltage provided to the controller 232. The controller 232 may maintain the capacitor 410 at a voltage between a high and a low threshold supply voltage to ensure proper operation of the controller 232. Time period $T_{DLY}$ 512 and time period $T_{REV}$ 514 may be modulated almost independently of each other, as long as the supplied base current $I_B$ drives the BJT 220 into saturation. If supply generation is not desired, then time period $T_{DLY}$ may be set to zero without changing the functioning of the rest of the circuit.

In some embodiments of the above circuits, the BJT 220 may have a base-emitter reverse breakdown voltage that must be avoided, such as a breakdown voltage of approximately 7 Volts. Thus, the controller 232 may be configured to ensure that when the base 226 is pulled down by the current source 422, the voltage at the base node 226 and the emitter node 224 may remain below this limit. When the switch 234 is off, the emitter may float to $V_{ddh}+V_d$. If the supply voltage $V_{ddh}$ is close to the breakdown voltage, such as 7 Volts, the base pull down with current source 422 may cause breakdown of the BJT 220. Thus, the controller 232, instead of pulling the base node 226 to ground, may pull the base node 226 to a fixed voltage which ensures the reverse voltage across the base node 226 and the emitter node 224 is less than the breakdown voltage, such as 7 Volts.

Certain parameters of the various circuits presented above may be used by the controller 232 to determine operation of the circuits. That is, the controller 232 may be configured to toggle control signals $V_{PLS,T1}$, $V_{PLS,T2}$, and/or $V_{PLS,T3}$ based on inputs provided from comparators 330 and 336 and/or a measured voltage level $V_{ddh}$. For example, the controller 232 may be configured to operate various components of the circuits based on detecting a beginning of a reverse recovery period. In one embodiment, the beginning of the reverse recovery period may be determined by detecting a signal from the comparator 330 of FIG. 3. In another embodiment, the beginning of the reverse recovery period may be determined by detecting the base voltage rising from approximately $V_{SNS}+V_{BE}$ to approximately $V_{DD,H}+V_D+V_{BE}$, either with the comparator 330 or another comparator. In another embodiment, the beginning of the reverse recovery period may be determined by detecting a rise in voltage at the emitter node 224 from $V_{th}$ to $V_{ddh}+V_D$.

In addition to detecting the beginning of the reverse recovery period, the controller 232 may be able to detect an end of the reverse recovery period. In one embodiment while referring back to FIG. 4, the controller 232 may receive an input signal corresponding to a voltage level at the base 226 of the BJT 220. For example, the comparator 330 may be coupled to the base node 226 and output a signal to the controller 232 indicating a difference between the voltage at the base node 226 and a reference voltage. When the $V_{PLS,T1}$ signal goes low, the switch 234 may turn off but the BJT 220 may not turn off due to stored charge at the base node 226. The voltage at the base node 226 of the BJT 220 may be equal to approximately $V_{DDH}+V_D+V_{BE}$, where $V_{DDH}$ is a voltage across the capacitor 410, $V_D$ is a voltage across the diode 412, and $V_{BE}$ is a voltage between the base node 226 and the emitter node 224. To decrease the turn off time of the BJT 220, the base 226 may be pulled down with a current of between approximately $0.1I_C$ and $0.5I_C$. As the base charge depletes, the BJT 220 may begin turning off. When the BJT 220 turns off, the voltage at the base node 226 of the BJT 220 may decrease rapidly. This drop in voltage may be sensed using, for example, the comparator 330. In one embodiment, a reference voltage to the comparator 330 may be $V_{ddh}-2$ V and a change of output signal level at the comparator 330 may thus indicate the end of the reverse recovery time.

Figure 6:
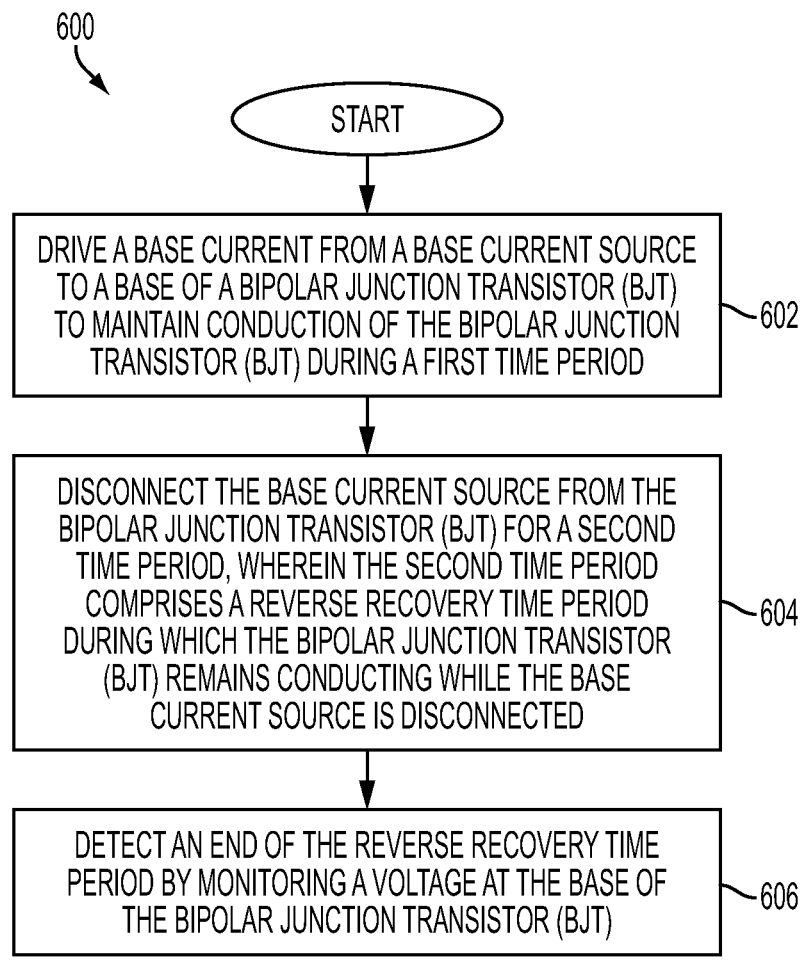
FIG. 6 is an example flow chart illustrating a method of determining reverse recovery time in a bipolar junction transistor (BJT) by measuring a base voltage of the BJT according to one embodiment of the disclosure.

One example method of detecting the end of the reverse time period while controlling the BJT 220 to operate a light bulb is shown in FIG. 6. The method of FIG. 6 may be executed by, for example, the controller 232 or another logic device. FIG. 6 is a flow chart illustrating a method of determining reverse recovery time in a bipolar junction transistor (BJT) by measuring a base voltage of the BJT according to one embodiment of the disclosure. A method 600 begins at block 602 with driving a base current from a base current source to a base of a BJT to maintain conduction of the bipolar junction transistor during a first time period. Then, at block 604, the base current source may be disconnected from the BJT for a second time period. The second time period may include a reverse recovery time period during which the BJT remains conducting even though the base current source is disconnected. At block 606, the end of the reverse recovery time period may be detected by monitoring a voltage at the base of the BJT. After the reverse recovery time period, the method 600 may return to block 602 to again drive the BJT into conduction with base current from a base current source. The timing of the steps of blocks 602, 604, and 606, along with a configurable delay after block 606 before returning to block 602 may allow the controller 232 to control delivery of power to light emitting diodes (LEDs) of a light bulb.

Operation of components of the circuitry of FIGS. 2, 3, and/or 4 may also be controlled to regulate current through a lighting load, such as LEDs, based on sensing collector flyback through terminals of the BJT 220. Sensing demagnetization of, for example, the inductor 212 of FIG. 2 may improve output current regulation by allowing detection of valleys within an oscillation of the inductor 212. After the inductor 212 demagnetizes, the collector 222 may begin oscillating, or ringing, at a frequency based, at least in part, on magnetizing inductance, leakage and trace inductances, and parasitic capacitances of the BJT 220. Higher efficiency and lower switching losses may be obtained by switching the power stage 210 on when the oscillating voltage of the collector 222 is at a valley. Sensing the collector flyback may allow detection of this valley and timing of switching on the power stage 210 at or near a valley.

Figure 7:
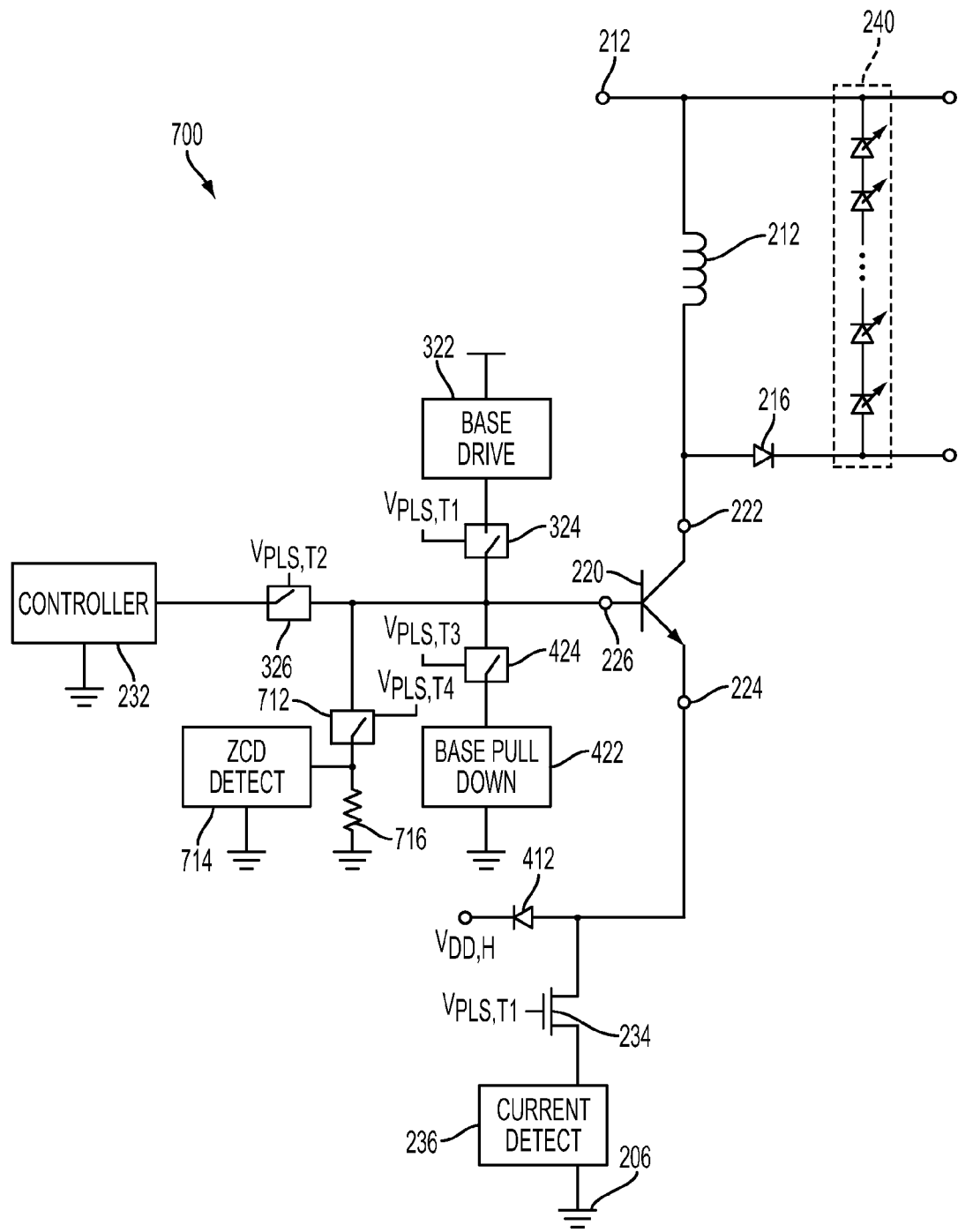
FIG. 7 is an example circuit schematic illustrating an emitter-controlled BJT-based power stage with zero current detect (ZCD) circuitry according to one embodiment of the disclosure.

In one embodiment, inductor demagnetization detection may be performed by zero current detection (ZCD) at the base node 226 of the BJT 220. FIG. 7 is an example circuit schematic illustrating an emitter-controlled BJT-based power stage with zero current detect (ZCD) circuitry according to one embodiment of the disclosure. FIG. 7 illustrates a BJT-based buck-boost topology. However, other topologies may also be implemented with the zero current detect (ZCD) circuitry described below. Circuit 700 may be similarly configured to any of the circuits 200, 300, or 400 of FIG. 2, FIG. 3, and FIG. 4, respectively. The circuit 700 may include a zero current detect (ZCD) circuitry 714 along with accompanying circuitry including switch 712 and resistor 716. The zero current detection may include measuring current from the base node 226 of the BJT 220. The ZCD circuit 714 may be activated by the controller 232 by turning on switch 712 to a conducting state through a control signal $V_{PLS,T4}$.

Figure 8:
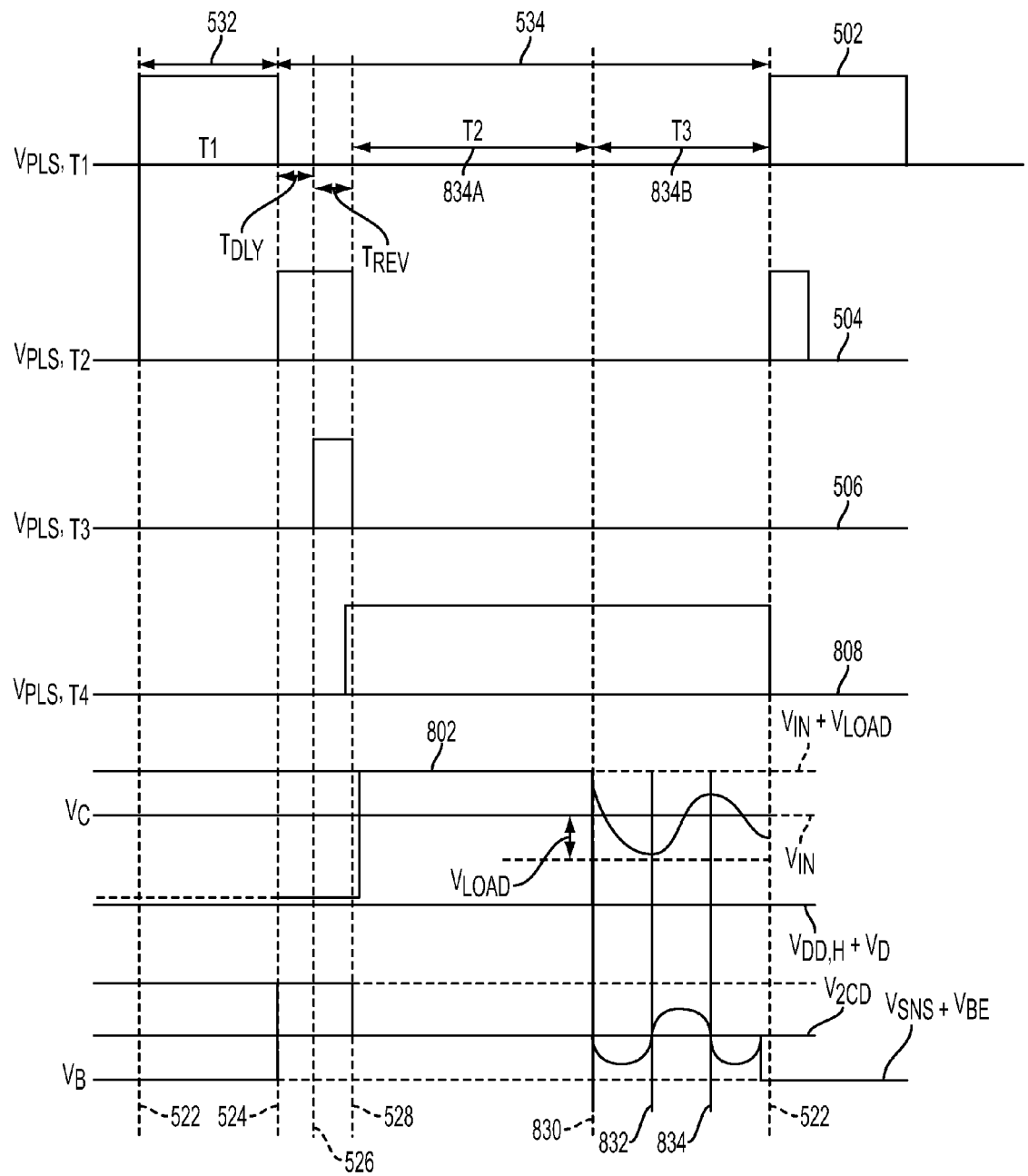
FIG. 8 are example graphs illustrating operation of a zero current detect circuit (ZCD) according to one embodiment of the disclosure.

FIG. 8 are example graphs illustrating operation of a zero current detect circuit (ZCD) according to one embodiment of the disclosure. The graphs of FIG. 8 are similar to those of FIG. 5. The graphs include a fourth control signal $V_{PLS,T4}$ 808 for activating the ZCD circuit 714. For example, the control signal $V_{PLS,T4}$ may be activated at or shortly after time 528. At a time 830 after time 528, the collector voltage $V_C$ and base voltage $V_B$ may begin ringing indicating the inductor 212 has discharged. Zero crossing of the base voltage $V_B$ illustrated in line 804 at time 832 and time 834 may be detected by the ZCD circuit 714. These zero crossings correspond to valleys in the collector voltage $V_C$ shown in line 802.

Operation of the ZCD circuit 714 throughout the various times in a cycle of the BJT-based power stage circuit 700 are further described below. During the time period 532, the emitter switch 234 is on, the base drive current source 322 may be connected to the base node 226, and the ZCD detect circuit 714, reverse recovery (RR) detect switch 326, and the base pull down switch 424 may be off. In this configuration, the collector voltage $V_C$ may be approximately $V_{SNS}$, the base voltage $V_B$ may be approximately $V_{SNS}+V_{BE}$, and current in the inductor 212 may begin increasing. The end of the time period 532 may be determined by the current detect circuit 236. After time 524, reverse-recovery (RR) switch 326 turns on with control signal $V_{PLS,T2}$ high and $V_{PLS,T1}$ low to detect the end of reverse recovery. If supply generation is being controlled in a loop, the BJT 220 may be kept on until adequate charge has been harvested into supply voltage $V_{DDH}$ during time period $T_{DLY}$. Thereafter, the control signal $V_{PLS,T2}$ may be turned on and the base of the BJT 220 may be pulled down. The BJT 220 may turn off after additional time $T_{REV}$. Thus, the BJT 220 may remain on for a duration $T_{DLY}+T_{REV}$ after the end of time period 532.

After the BJT 220 turns off at time 528, the control signals $V_{PLS,T2}$ and $V_{PLS,T3}$ may be turned off and the control signal $V_{PLS,T4}$ turned on to sense the end of inductor 212 demagnetization. During a time period 834A, energy stored in the inductor 212 may be transferred into a load 240, such as LEDs 214. During that energy transfer, the ZCD detect circuit 714 may provide a resistive path from the base node 226 to ground 206 for protection of the BJT 220 by providing a low impedance path from base node 226 to ground 206 while the emitter node 224 is floating. After the current through the inductor 212 reaches approximately zero, the collector voltage $V_C$ may begin oscillating during time period 834B. Detecting the valleys of the collector voltage $V_C$ may improve efficiency of the circuit 700 by allowing the control signal $V_{PLS,T1}$ to be timed coincident with a valley of the collector voltage $V_C$.

In one embodiment, detection of the valleys is based on the use of a high-pass (HP) filter formed from the collector-to-base capacitance of the BJT 220 and the resistor 716. The detection mechanism may be based on the use of a high-pass (HP) filter formed by the collector-to-base parasitic capacitance $C_{CB}$ of the BJT 220 along with the resistor 716. The high-pass (HP) filter may perform the function of a differentiator creating zero crossings from the first roll off time of the collector 226, from the time when the collector voltage $V_C$ starts drooping during time period 834A, at the times of the valleys of the collector voltage $V_C$, and/or at the times of the peaking of the oscillations in collector voltage $V_C$. These zero crossings may be detected, for example, by using a comparator. Alternatively, the reference signal for the comparator and the ZCD input may be offset by a fixed voltage $V_{bias}$ and valleys detected when the voltage at the ZCD circuit 714 crosses $V_{bias}$. After the valleys are detected, the time between two valleys may be used to compute an oscillation frequency at the collector node 222. In some embodiments, this time may be mathematically manipulated, such as dividing by four to determine an offset to arrive at an accurate demagnetization time. This determination can further be used as an offset to determine the time period 834A before the inductor 212 demagnetizes.

For the high-pass (HP) filter to function similar to a differentiator, the pole of the filter should be designed away from a maximum possible oscillation frequency of the collector voltage $V_C$ such that the phase shift remains approximately constant and equal to 90 degrees. The following equations show the high-pass filter transfer function, $H_{zcd}(s)$, and approximate detected zero current amplitude, $V_{peak,zcd}$:

$$H_{zcd}(s) = \frac{R_{zcd}C_{cb}s}{1 + R_{zcd}C_{cb}s},$$

and $$V_{peak,zcd} \approx R_{zcd}\omega_{ring}C_{cb},$$

where $R_{zcd}$ is a resistance value for the resistor 716, $C_{CB}$ is a collector-to-base capacitance of the BJT 220. An appropriate resistance value for the resistor 716 may be selected based on the above equations considering the minimum and maximum range of the ringing frequencies, $\omega_{ring}$, and a minimum detectable ringing amplitude, $V_{peak,zcd}$.

Figure 9:
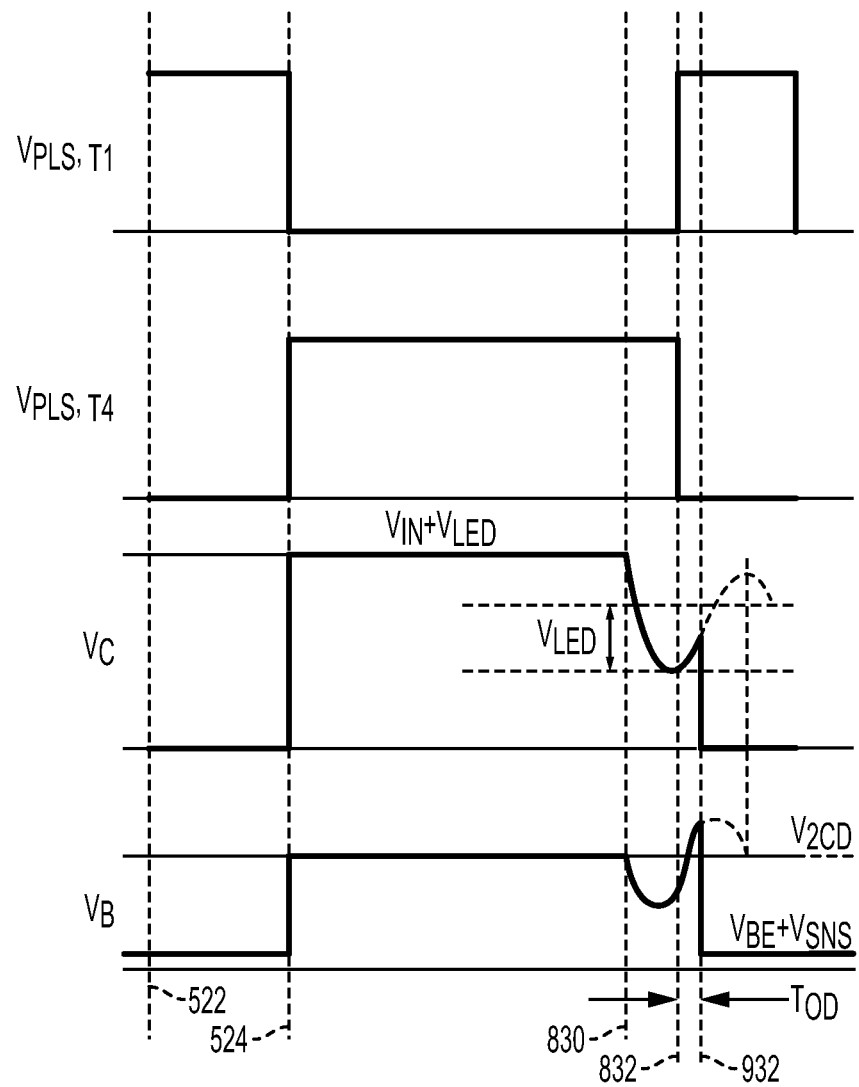
FIG. 9 are example graphs illustrating switch turn-on delay according to one embodiment of the disclosure.

Efficiency may be improved when the BJT 220 switches on near a valley by reducing switching losses in the circuit 700. Although the ZCD circuit 714 described above may provide a determination or approximation of valleys in the collector voltage $V_C$, there may be delays in signal propagation and switching time losses that add inefficiencies, even when the collector voltage $V_C$ valley times are known. These delay components may be approximated or measured and compensated for in the generation of control signals $V_{PLS,T1}$, $V_{PLS,T2}$, $V_{PLS,T3}$, and $V_{PLS,T4}$ by the controller 232. For example, signal and switch operation delay may be taken into account to further improve efficiency and time switching of the BJT 220 nearer to the valley. There may be a delay between the control signal $V_{PLS,T1}$ being sent to the switch 324 and the switch 324 actually turning on defined as turn-on delay $T_{od}$. Time delay $T_{od}$ causes the switch 324 to turn on shortly after the valley is reached as shown in FIG. 9. FIG. 9 are example graphs illustrating switch turn-on delay according to one embodiment of the disclosure. A valley at time 832 may be detected causing the control signal $V_{PLS,T1}$ to be switched on. However, the switch 324 may not turn on until time 932 after delay $T_{od}$. The delay $T_{od}$ causes switching losses because the BJT 220 is not turned on at a valley of the collector voltage $V_C$. If this delay $T_{od}$ is fixed, the delay may be compensated with an offset and the switch turn-on signal sent prior to the actual valley by an amount $T_{od}$. If the delay changes with the operating point, power stage switch type, temperature, or other factors, the delay $T_{od}$ may be detected and compensated in real-time by the controller 232.

Figure 10:
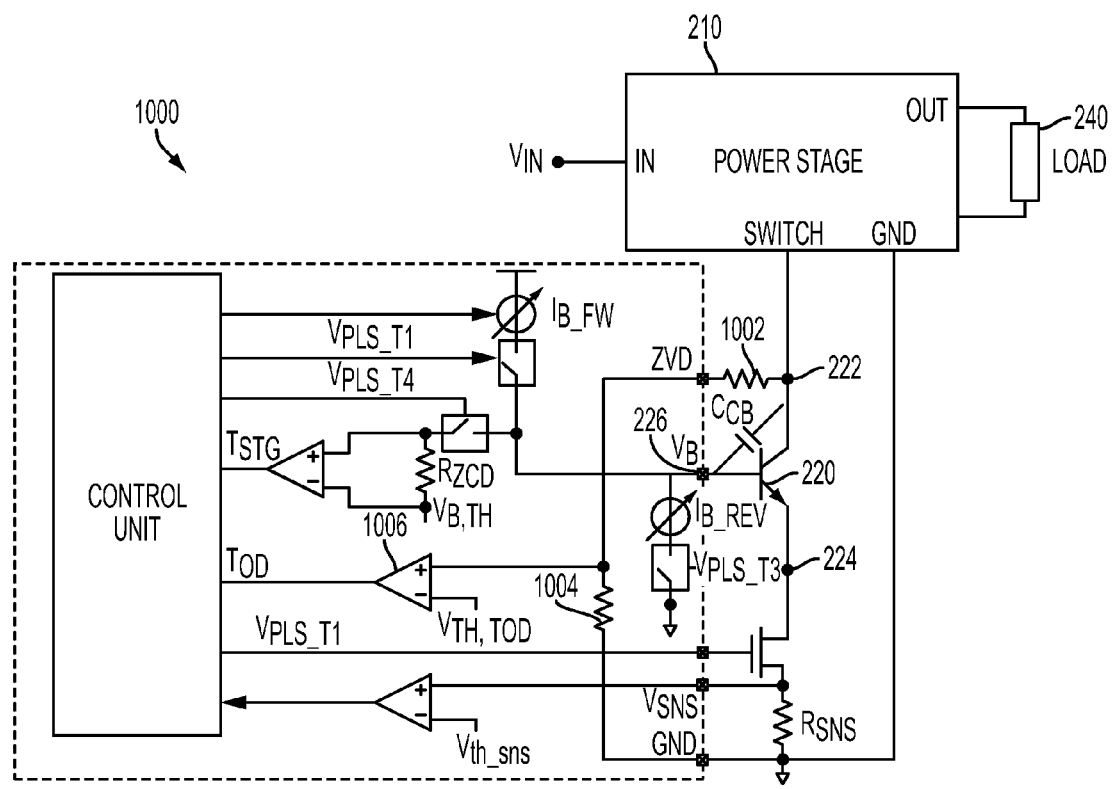
FIG. 10 is an example circuit schematic illustrating an emitter-controlled BJT-based power stage with zero current detect (ZCD) circuitry and delay compensation circuitry according to one embodiment of the disclosure.

Variable $T_{od}$ determination and compensation may be performed with additional circuitry, such as shown in FIG. 10. FIG. 10 is an example circuit schematic illustrating an emitter-controlled BJT-based power stage with zero current detect (ZCD) circuitry and delay compensation circuitry according to one embodiment of the disclosure. The additional circuitry may be configured to measure a collector voltage $V_C$ of the BJT 220. For example, a circuit 1000 may include an additional resistor divider formed from resistor 1002 and 1004. This resistor divider may scale down the collector voltage $V_C$ and compare it to a low voltage threshold reference signal $V_{TH,TOD}$ at comparator 1006.

Figure 11:
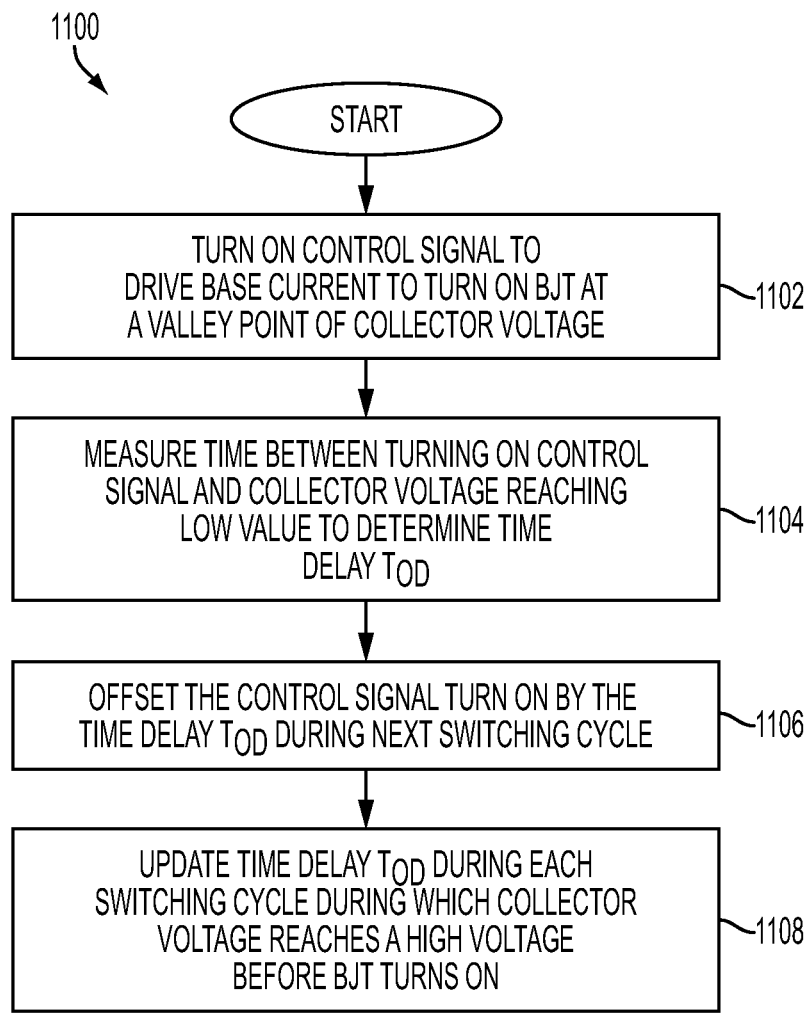
FIG. 11 is an example flow chart illustrating operation of dynamic time delay compensation according to one embodiment of the disclosure.

One method for operating the circuit 1000 of FIG. 10 is shown in the flow chart of FIG. 11. FIG. 11 is an example flow chart illustrating operation of dynamic time delay compensation according to one embodiment of the disclosure. A method 1100 begins at block 1102 with turning on the BJT 220, such as by switching the control signal $V_{PLS,T1}$ high at an estimated or measured valley point of the collector voltage $V_C$. Then, at block 1104, a time may be measured between the control signal switching at block 1102 and a decrease in the collector voltage $V_C$ to a predetermined low voltage. This comparison may be performed, for example, with comparator 1006 of FIG. 10. The time difference measured at block 1104 is the turn-on delay $T_{od}$. The delay $T_{od}$ may then be used to offset the turn-on signal in the next switching cycle at block 1106. In some embodiments, the time difference may be updated in each switching cycle during which the comparator 1006 trips indicating that the collector voltage $V_C$ reached a predetermined high voltage before the BJT 220 actually turned on. In the embodiment of FIG. 10, the comparator 1006 may be controlled by signal $V_{PLS,T4}$ and used for reverse recovery and zero current detection (ZCD).

Figure 12:
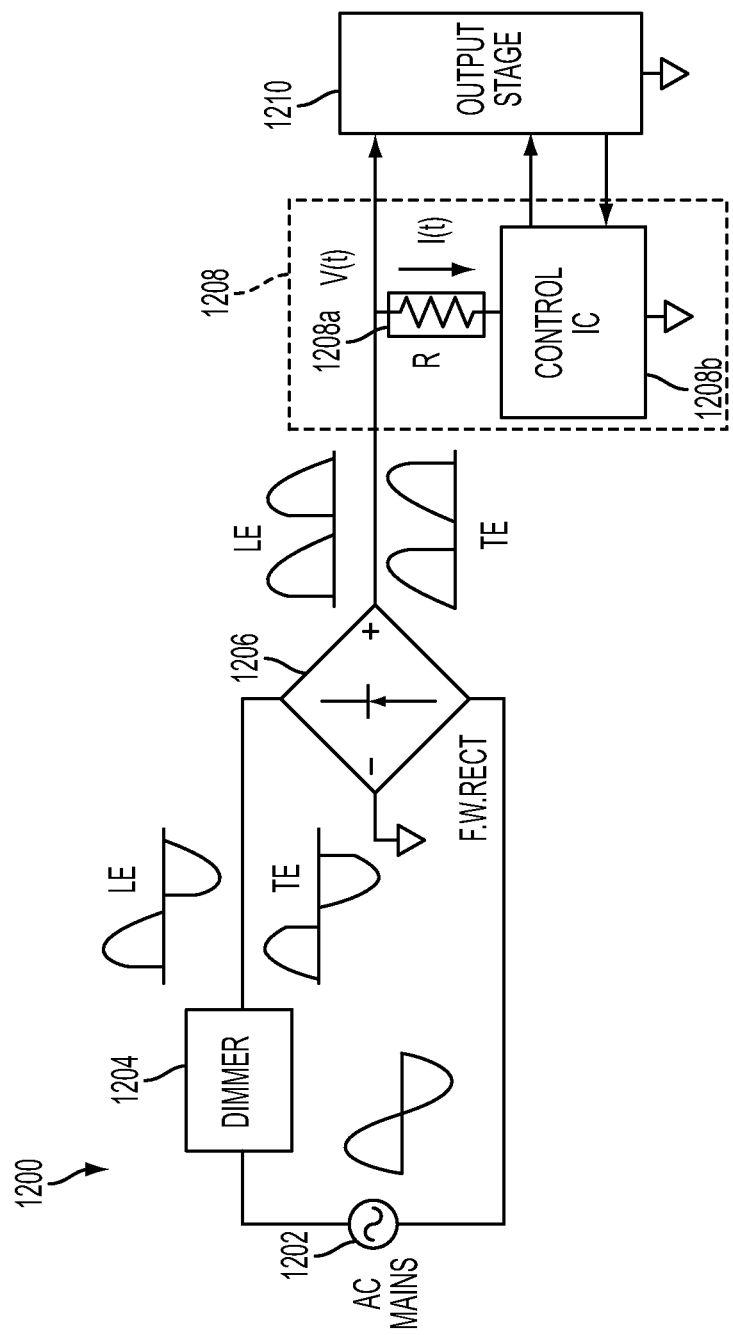
FIG. 12 is an example block diagram illustrating a dimmer system for a light-emitting diode (LED)-based bulb with two terminal drive of a bipolar junction transistor (BJT)-based power stage according to one embodiment of the disclosure.

The circuits described above, including the circuits 200, 300, 400, 700, and 1000 of FIGS. 2, 3, 4, 7, and 10, respectively, described above may be integrated into a dimmer circuit to provide dimmer compatibility, such as with lighting devices. FIG. 12 is a block diagram illustrating a dimmer system for a light-emitting diode (LED)-based bulb with two terminal drive of a bipolar junction transistor (BJT)-based power stage according to one embodiment of the disclosure. A system 1200 may include a dimmer compatibility circuit 1208 with a variable resistance device 1208a and a control integrated circuit (IC) 1208b. The dimmer compatibility circuit 1208 may couple an input stage having a dimmer 1204 and a rectifier 1206 with an output stage 1210, which may include light emitting diodes (LEDs). The system 1200 may receive input from an AC mains line 1202. The output stage 1210 may include a power stage based on a bipolar junction transistor (BJT) as described above. For example, the output stage 1210 may include an emitter-switched bipolar junction transistor (BJT) in the configurations of FIG. 2, FIG. 3, FIG. 4, FIG. 7, or FIG. 10.

If implemented in firmware and/or software, the functions described above, such as with respect to the flow charts of FIG. 6 and FIG. 11 may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically erasable programmable read-only memory (EEPROM), compact-disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. For example, although signals generated by a controller are described throughout as "high" or "low," the signals may be inverted such that "low" signals turn on a switch and "high" signals turn off a switch. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   driving a base current from a base current source to a base of a bipolar junction transistor (BJT) to maintain conduction of the bipolar junction transistor (BJT) during a first time period;
   disconnecting the base current source from the bipolar junction transistor (BJT) for a second time period, wherein the second time period comprises a reverse recovery time period during which the bipolar junction transistor (BJT) remains conducting while the base current source is disconnected; and
   detecting an end of the reverse recovery time period by monitoring a voltage at the base of the bipolar junction transistor (BJT).

2. The method of claim 1, wherein the step of detecting the end of the reverse recovery time period comprises detecting the base voltage is at least 2 Volts below a supply voltage.

3. The method of claim 1, wherein the step of driving the base current maintains conduction of the bipolar junction transistor (BJT) to charge an energy storage device coupled to a load.

4. The method of claim 3, further comprising:
   detecting de-engergization of the energy storage device during the second time period; and
   repeating the step of driving the base current after detecting the de-energization.

5. The method of claim 4, wherein the step of detecting de-energization of the energy storage device comprises detecting a zero current through the energy storage device.

6. The method of claim 5, wherein the step of detecting the zero current comprises detecting the zero current at the base of the bipolar junction transistor (BJT).

7. The method of claim 4, wherein the step of detecting de-energization comprises coupling a resistor to the base of the bipolar junction transistor (BJT) to form a high pass filter (HPF) with a capacitor, wherein the capacitor is coupled to the base of the bipolar junction transistor (BJT) and an emitter of the bipolar junction transistor (BJT).

8. The method of claim 7, wherein the high pass filter (HPF) comprises at least one pole at a frequency greater than an expected oscillation frequency of a voltage at a collector of the bipolar junction transistor (BJT) when the energy storage device is de-energized.

9. The method of claim 4, wherein the step of detecting de-energization comprises detecting a ringing voltage at a collector of the bipolar junction transistor (BJT).

10. The method of claim 9, wherein the step of repeating the step of driving the base current comprises coupling the base current source to the base of the bipolar junction transistor (BJT) prior to approximately a minimum voltage at the collector of the bipolar junction transistor (BJT) during the detected ringing.

11. The method of claim 10, wherein the step of coupling the base current source prior to approximately a minimum voltage comprises coupling the base current source a fixed delay offset duration prior to approximately the minimum voltage.

12. The method of claim 10, further comprising:
measuring a turn-on delay of the bipolar junction transistor when repeating the step of driving the base current; and
again repeating the step of driving the base current by coupling the base current source to the base of the bipolar junction transistor (BJT) a time prior to approximately a minimum voltage at the collector of the bipolar junction transistor (BJT), wherein the time prior is based, at least in part, on the measured turn-on delay.

13. An apparatus, comprising:
a controller configured to couple to a base of a bipolar junction transistor (BJT);
wherein the controller is configured to perform the steps comprising:
driving a base current from a base current source to the base of the bipolar junction transistor (BJT) to maintain conduction of the bipolar junction transistor (BJT) during a first time period;
disconnecting the base current source from the bipolar junction transistor (BJT) for a second time period, wherein the second time period comprises a reverse recovery time period during which the bipolar junction transistor (BJT) remains conducting while the base current source is disconnected; and
detecting an end of the reverse recovery time period by monitoring a voltage at the base of the bipolar junction transistor (BJT).

14. The apparatus of claim 13, wherein the step of detecting the end of the reverse recovery time period comprises detecting the base voltage is at least 2 Volts below a supply voltage.

15. The apparatus of claim 13, wherein the step of driving the base current maintains conduction of the bipolar junction transistor (BJT) to charge an energy storage device coupled to a load.

16. The apparatus of claim 15, wherein the controller is further configured to perform the steps of:
detecting de-engergization of the energy storage device during the second time period; and
repeating the step of driving the base current after detecting the de-energization.

17. The apparatus of claim 16, wherein the step of detecting de-energization of the energy storage device comprises detecting a zero current through the energy storage device.

18. The apparatus of claim 17, wherein the step of detecting the zero current comprises detecting the zero current at the base of the bipolar junction transistor (BJT).

19. The apparatus of claim 16, wherein the step of detecting de-energization comprises coupling a resistor to the base of the bipolar junction transistor (BJT) to form a high pass filter (HPF) with a capacitor, wherein the capacitor is coupled to the base of the bipolar junction transistor (BJT) and an emitter of the bipolar junction transistor (BJT).

20. The apparatus of claim 19, wherein the high pass filter (HPF) comprises at least one pole at a frequency greater than an expected oscillation frequency of a voltage at a collector of the bipolar junction transistor (BJT) when the energy storage device is de-energized.

21. The apparatus of claim 16, wherein the step of detecting de-energization comprises detecting a ringing voltage at a collector of the bipolar junction transistor (BJT).

22. The apparatus of claim 21, wherein the step of repeating the step of driving the base current comprises coupling the base current source to the base of the bipolar junction transistor (BJT) prior to approximately a minimum voltage at the collector of the bipolar junction transistor (BJT) during the detected ringing.

23. The apparatus of claim 22, wherein the step of coupling the base current source prior to approximately a minimum voltage comprises coupling the base current source a fixed delay offset duration prior to approximately the minimum voltage.

24. The apparatus of claim 22, wherein the controller is further configured to perform the steps of:
measuring a turn-on delay of the bipolar junction transistor when repeating the step of driving the base current; and
again repeating the step of driving the base current by coupling the base current source to the base of the bipolar junction transistor (BJT) a time prior to approximately a minimum voltage at the collector of the bipolar junction transistor (BJT), wherein the time prior is based, at least in part, on the measured turn-on delay.

* * * * *